United States Patent
Kelif

(10) Patent No.: US 12,464,492 B2
(45) Date of Patent: Nov. 4, 2025

(54) METHOD FOR GEOLOCATING AN ITEM OF USER EQUIPMENT, DEVICE, ITEM OF USER EQUIPMENT, BASE STATION, SYSTEM AND COMPUTER PROGRAM CORRESPONDING THERETO

(71) Applicant: Orange, Issy-les-Moulineaux (FR)

(72) Inventor: Jean-Marc Kelif, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 419 days.

(21) Appl. No.: 17/997,532

(22) PCT Filed: Apr. 29, 2021

(86) PCT No.: PCT/FR2021/050747
§ 371 (c)(1),
(2) Date: Oct. 28, 2022

(87) PCT Pub. No.: WO2021/219966
PCT Pub. Date: Nov. 4, 2021

(65) Prior Publication Data
US 2024/0298293 A1    Sep. 5, 2024

(30) Foreign Application Priority Data
Apr. 30, 2020 (FR) ..................................... 2004322

(51) Int. Cl.
*H04W 64/00* (2009.01)
*H04B 17/318* (2015.01)

(52) U.S. Cl.
CPC ........ *H04W 64/006* (2013.01); *H04B 17/318* (2015.01)

(58) Field of Classification Search
CPC ....... H04W 64/00; H04W 4/02; H04W 4/029; H04W 4/025; H04W 64/003; H04W 76/50; H04W 12/63
See application file for complete search history.

(56) References Cited

U.S. PATENT DOCUMENTS

| | | | |
|---|---|---|---|
| 2004/0203539 A1 | 10/2004 | Benes et al. | |
| 2005/0032531 A1* | 2/2005 | Gong | G01S 5/02521 342/357.29 |
| 2011/0177832 A1* | 7/2011 | Huang | H04W 64/003 455/457 |

FOREIGN PATENT DOCUMENTS

| | | | |
|---|---|---|---|
| EP | 2773156 A1 | 9/2014 | |
| WO | WO 2018/060665 A1 | 4/2018 | |

OTHER PUBLICATIONS

Report ITU-R M.2135-1 "Guidelines for evaluation of radio interface technologies for IMT-Advanced", Dec. 2009.

(Continued)

*Primary Examiner* — Kwasi Karikari

(74) *Attorney, Agent, or Firm* — Knobbe, Martens, Olson & Bear, LLP

(57) ABSTRACT

A method for geolocating an item of user equipment located at a given altitude, receiving a plurality of radio beams emitted in at least a first and a second propagation direction by at least one antenna of a first base station and by at least one antenna of a second base station, respectively, in at least a third and a fourth propagation direction is disclosed. The method involves: obtaining a power measured by the item of terminal equipment for radio beams emitted by the first base station; calculating at least one item of information per base station, representative of a ratio or of a difference between a first and a second power of each set of measured powers; and determining a position of the item of user equipment at the given altitude.

17 Claims, 5 Drawing Sheets

(56) References Cited

OTHER PUBLICATIONS

International Search Report for International Patent Application No. PCT/FR2021/050747 dated Sep. 9, 2021.

* cited by examiner

METHOD FOR GEOLOCATING AN ITEM OF USER EQUIPMENT, DEVICE, ITEM OF USER EQUIPMENT, BASE STATION, SYSTEM AND COMPUTER PROGRAM CORRESPONDING THERETO

CROSS-REFERENCE TO RELATED APPLICATIONS

This application is filed under 35 U.S.C. § 371 as the U.S. National Phase of Application No. PCT/FR2021/050747 entitled "METHOD FOR GEOLOCATING AN ITEM OF USER EQUIPMENT, DEVICE, ITEM OF USER EQUIPMENT, BASE STATION, SYSTEM AND COMPUTER PROGRAM CORRESPONDING THERETO" and filed Apr. 29, 2021, and which claims priority to FR 2004322 filed Apr. 30, 2020, each of which is incorporated by reference in its entirety.

BACKGROUND

Field

The present development pertains to the general field of telecommunications. It relates more particularly to a wireless communication network and a method for locating a user of an item of terminal equipment in such a telecommunications network.

Description of the Related Technology

Many services or applications offered today by telecommunications network operators are based on a geographical location of the users' terminals. These services known as LSB (Location Based Services) are of great interest both for commercial applications (gaming, advertising, etc.) and for safety-related applications (emergency response, medical, alert services, etc.).

Indeed, various techniques are known for determining the geographical position of a user, i.e. for geolocating them.

A widely used technique is based on signals broadcast by satellites orbiting the Earth. According to this technique, the most well known system is the GPS (Global Positioning System) system. Each satellite sends signals indicating its position in space and the time and date of transmission of said signals. A GPS receiver embedded in a terminal of the user receives these signals, then calculates the travel time of each signal between the transmitting satellite and the receiver, and finally deduces, by trilateration, its position, in latitude, longitude and altitude, on the globe. For the system to work, data received from four satellites must be compiled: three for position and one for synchronisation. With such a system, the terminal of a user, whether on land, at sea or in the air, can know its position at any time and any place on or near the Earth's surface, provided it is equipped with a receiver and the software needed to process the information received.

The accuracy of the estimation provided by the GPS with respect to its actual location depends on the number of satellites visible to the GPS system, which can vary greatly depending on the weather conditions, but for a mobile terminal such as a smartphone, it can be as much as 5 to 10 m.

On the other hand, GPS systems are resource-intensive, which can be problematic when they are used in battery-powered terminals such as mobile phones. That is precisely the case for users' terminal equipment located on ships sailing at sea.

There is, therefore, a need for a technique for locating an item of user equipment that would still be accurate enough to be a good alternative to GPS, while being more resource-efficient.

SUMMARY

The development responds to this need by proposing a method for geolocating an item of user equipment located at a given altitude, receiving a plurality of radio frequency beams transmitted respectively by at least one antenna of a first base station configured to transmit according to at least a first and a second propagation direction, and by at least one antenna of a second base station configured to transmit according to at least a third and a fourth propagation direction.

The method implements:
obtaining a power measured by said item of terminal equipment for radio frequency beams transmitted by the first base station according to at least the first and the second propagation direction and radio frequency beams transmitted by the second base station according to at least the third and the fourth propagation direction, delivering respectively a first set of measured powers for the first base station and a second set of measured powers for the second base station;
calculating at least one item of information per base station, representative of a ratio or a difference between a first and a second power of each set of measured powers, referred to as first item of relative power information for the first base station and second item of relative power information for the second base station, the first power being associated for the first base station with a radio frequency beam transmitted according to the first propagation direction and the second power being associated with a beam transmitted according to the second propagation direction, the first power being associated for the second base station with a radio frequency beam transmitted according to the third propagation direction and the second power being associated with a beam transmitted according to the fourth propagation direction; and
determining a position of said item of user equipment at the given altitude from, on the one hand, said at least one first and second item of relative power information and, on the other hand, for each item of relative power information and for each radio frequency beam associated with said item of relative power information, an antenna radiation pattern model characterising the power of said radio frequency beam associated with said item of relative power information, according to the direction of observation of the item of user equipment by said antenna.

Thus the development is based on a completely new and inventive approach to geolocate an item of user equipment located at a given altitude and within range of a first and a second base station (e.g. connected to one of the base stations) of a radio communications network (e.g. a radio communications network that complies with 3GPP standards).

More particularly, the position of the item of user equipment is determined from power measurements of different signals transmitted from two base stations each capable of transmitting according to two distinct propagation directions (e.g. signals transmitted via two sector antennas of each base station, or signals corresponding to different beams of an array of radiating elements equipping each base station).

Furthermore, this determination is based on the calculation of relative power information from the measured powers. Such information is representative of a ratio (when powers are expressed in natural units) or a difference (when powers are expressed in logarithmic units) between the two powers of two given radio frequency beams. In this manner, the effects of path loss, fast fading and shadowing are eliminated. Indeed, this type of phenomenon impacts in the same way the two radio frequency beams considered, these beams being transmitted by radiating elements located approximately at a same geographical point of the same base station. The calculation of a relative power thus cancels the effects of these phenomena on the signals received by the item of user equipment. Note that according to a SISO-type (Single Input Single Output) technology, if the antennas are not exactly located at the same point, an average of the powers measured over a given period eliminates fading effects. In a MIMO-type (Multiple-Input Multiple-Output) antenna configuration, such an averaging is unnecessary. Finally, using radiation pattern models provides a simple and robust way of tracing the (item of) relative power information to the position of the item of user equipment, without having to know the characteristics of the antennas of the second base station.

The development applies to the geolocation of any type of item of user equipment provided that it is simultaneously within range of beams transmitted by a first base station, respectively a second base station, according to two distinct propagation directions and that its altitude is known. It is therefore particularly well suited to locating ships at sea which may, because the antennas of a land-based base station tend to face inland, receive only part of the signals transmitted by that base station, such as the beams transmitted by two of the three antennas of that base station.

However, it is also applicable to geolocating user equipment located in any other type of geographical environment where the installation of base stations with two antennas or a single antenna comprising an array of radiating elements is recommended or encountered.

According to one aspect of the development, said determination implements, for at least one given item of relative power information among the (item of) relative power information, solving an equation whose members are a function, on the one hand, of said calculated item of relative power information and, on the other hand, of an expected value of said given item of relative power information, function, for each radio frequency beam associated with said given item of relative power information, of the radiation pattern model characterising the power of said radio frequency beam associated with said given item of relative power information, according to the direction of observation of the item of user equipment by said antenna.

Thus, the position of the item of user equipment is determined in a simple and robust manner by matching the (item of) relative power information calculated from the measured powers with the expected value(s) as predicted by the radiation pattern models of the antennas used.

According to another aspect of the development, the first base station comprises a first sector antenna configured to transmit radio frequency beams according to the first propagation direction and a second sector antenna configured to transmit radio frequency beams according to the second propagation direction, and the second base station comprises a first sector antenna configured to transmit radio frequency beams according to the third propagation direction and a second sector antenna configured to transmit radio frequency beams according to the fourth propagation direction, said obtaining comprises obtaining a first and a second measured power corresponding respectively to a first radio frequency beam transmitted by the first, respectively the second, sector antenna of said first, respectively second, base station and to a second radio frequency beam transmitted by the first, respectively the second, sector antenna of said first, respectively second, base station.

The calculation delivers a first, respectively a second, item of relative power information associated with said first and second radio frequency beams for each base station, and said determination comprises the determination of an angle representative of a longitude of said item of user equipment in a frame of the first, respectively the second, base station from, on the one hand, said first, respectively the second, item of relative power information and, on the other hand, an antenna radiation pattern model characterising the power, according to said longitude and latitude angles of the item of user equipment, of said first and second radio frequency beams.

An advantage of this embodiment is that it is relatively easy to obtain a longitude angle of the item of user equipment in the frame of each base station.

According to yet another aspect of the development, said solving comprises, for each base station, implementing the equation:

$$\theta 1i = -(M1i_{dB}/24)\theta_{3dB}^2/\theta b_i + \theta b_i/2,$$

where:
  i is an integer which is 1 when it refers to the first base station and 2 when it refers to the second base station;
  $\theta 1i$ represents said angle representative of a longitude of said item of user equipment in the frame of the i-th base station,
  $\theta 1i_{dB}$ represents said i-th item of relative power information expressed in decibels,
  $\theta_{3\ dB}$ represents the three-decibel opening angle of the radiation pattern of each of said first and second antennas in a definition plane of said angle $\theta 1i$, and
  $\theta b_i$ represents the deviation angle between said first and second antennas of the i-th base station in said definition plane of said angle $\theta 1i$.

Thus, the angle representative of the longitude of the item of user equipment is determined in a simple and robust manner in the frame of each of the two base stations, when they implement a SISO-type technology over different coverage sectors.

According to yet another aspect of the development, said first and second radio frequency beams are radiated by said first and second antennas of the first base station according to a first tilt angle,
  said obtaining comprises obtaining a third measured power corresponding to a third radio frequency beam transmitted by said first antenna of the first base station according to a third tilt angle, distinct from the first tilt angle,
  said calculation delivers a third item of relative power information, representative of a ratio or a difference between the third measured power and the first power of the first set of measured powers;

and said determination comprises a first determination of an angle representative of a latitude of said item of user equipment in the frame of the first base station from, on the one hand, said third item of relative power information and, on the other hand, an antenna radiation pattern model characterising the power, according to said longitude and latitude angles of the item of user equipment, of said first, second and third radio frequency beams of the first base station.

Thus, the angle noted hereafter φ1 representative of a latitude of the item of user equipment is determined in a simple and precise manner from the beams transmitted by the two antennas of the first base station when they transmit radio frequency beams according to two different tilt angles.

Note that the tilt angle of the antennas of the second base station may be the same as that of the first one.

According to yet another aspect of the development, said determination comprises implementing the equation:

$$\varphi 11 = M12_{dB}/24\varphi_{3dB}^2/(\varphi t1 - \varphi t3) + (\varphi t1 + \varphi t3)/2,$$

where:
- φ11 represents said angle representative of a latitude of said item of user equipment in the frame of the first base station,
- $M12_{dB}$ represents said second item of relative power information expressed in decibels,
- $\varphi_{3\ dB}$ represents the three-decibel opening angle of the radiation pattern of each of said first and second antennas in a definition plane of said angle φ11,
- φt1 represents said first tilt angle, and
- φt3 represents said third tilt angle.

According to yet another aspect of the development, said determination of a position comprises a second determination of a value of the latitude angle of the item of user equipment in the frame of the first base station, according to a height of the first antenna of the first base station, and of the longitude angles of the item of user equipment in the respective frames of the first and the second base station and a selection of the value of the longitude angles of the item of user equipment minimising an error between the first and the second determination of the latitude angle.

Thus, use is made of the relative position of the two base stations and the trigonometric relationships between the angles to remove an ambiguity about the value of the longitude angle of the item of user equipment and to determine the latitude angle of the item of user equipment within the power measurement inaccuracy.

According to yet another aspect of the development, said determination comprises calculating the coordinates (x1, y1, z1) of the item of user equipment in the frame of the first base station from the determined longitude angles.

Thus, the coordinates (x1, y1, z1) of the item of user equipment with respect to the first base station are determined in a simple and robust manner, without relying on characteristics of the second base station, such as the height of its antennas.

According to another aspect of the development, the first base station comprises an antenna comprising an array of radiating elements, configured to transmit radio frequency beams according to at least the first propagation direction and the second propagation direction and the second base station comprises an antenna comprising an array of radiating elements configured to transmit radio frequency beams according to at least the third propagation direction and the fourth propagation direction and each radio frequency beam of said plurality of radio frequency beams is radiated by the array of radiating elements of said first, respectively second, base station.

Thus, the method according to the development is also applicable in the case of a base station implementing a MIMO-type technology.

According to another aspect of the development, said equation solving comprises implementing a method for numerically solving said at least one equation.

According to yet another aspect, said solving implements for said at least one given item of relative power information:
- obtaining said expected value of said given item of relative power information for a set of directions of observation of the item of user equipment delivering a set of expected values each corresponding to one direction of observation of the item of user equipment among a plurality of directions of observation;
- comparing between, on the one hand, said calculated item of relative power information and, on the other hand, each expected value of said set of expected values delivering a direction of observation for which the expected value of said given relative power is closest to the calculated item of relative power information; and said position of said item of user equipment being a function of the direction of observation delivered.

Thus, the equation(s) involved is/are solved in a simple and robust manner by exploring the space of possible solutions.

In embodiments, the possible direction of observation corresponds to the item of relative power information expected or theoretical value among the expected values of the set of expected values that is closest to the item of relative power information calculated from the measured powers, within the power measurement inaccuracy.

According to another aspect of the development, for the first, respectively the second, base station, said antenna radiation pattern model characterising the power of an i-th radio frequency beam according to a direction of observation of the item of user equipment (θ, φ) is expressed according to:

$$A_{A,Beami}(\theta, \varphi) = A_E(\theta, \varphi) + 10\log_{10}\left(\left|\sum_{m=1}^{N_H}\sum_{n=1}^{N_V} w_{l,n,m} \cdot v_{n,m}\right|^2\right)$$

with:

$$v_{I,n,m} = \exp\left(i2\pi\left((n-1)\frac{d_V}{\lambda}\cos\left(\frac{\pi}{2}+\theta\right) + (m-1)\frac{d_H}{\lambda}\sin\left(\frac{\pi}{2}+\theta\right)\sin\left(\frac{\pi}{2}+\varphi\right)\right)\right)$$

$$w_{i,n,m} = \frac{1}{\sqrt{N_H N_V}}\exp\left(i2\pi\left((n-1)\frac{d_V}{\lambda}\sin\left(\frac{\pi}{2}+\varphi_{i,escan}\right) + (m-1)\frac{d_H}{\lambda}\cos\left(\frac{\pi}{2}+\varphi_{i,escan}\right)\sin(\theta_{i,etilt})\right)\right)$$

where:
- θ represents an angle representative of a longitude of the item of user equipment in a frame of the first, respectively second, base station,
- φ represents an angle representative of a latitude of the item of user equipment in the frame of the first, respectively second, base station,
- ($\theta_{i,escan}$, $\varphi_{i,etilt}$) represents a pair of angles characteristic of the desired main propagation direction for said i-th radio frequency beam in a frame of the antenna, $N_H$ represents the number of radiating elements of said array of radiating elements in a horizontal direction, $N_V$ represents the number of radiating elements of said array of radiating elements in a vertical direction, $d_V$ represents the vertical spacing between two radiating elements, $d_H$ represents the horizontal spacing between two radiating elements, $\lambda$ represents the wavelength of the radio frequency beam, and $A_E(\theta, \varphi)$ represents the radiation pattern of each radiating element of said array of radiating elements; and said determination comprises a first determination of at least two pairs of values of the longitude angle and the latitude angle ($\theta 1$, $\varphi 1$) of the item of user equipment in the frame of the first base station from said radiation pattern, a second determination of at least two pairs of values of the longitude angle and the latitude angle of the item of user equipment in the frame of the second base station from said radiation pattern, a third determination of a second value of the latitude angle of the item of user equipment (UE) in the frame of the first base station, according to a height of the first base station and the longitude angles of the item of user equipment in the respective frames of the first and the second base station, and a selection of the values of the longitude angles of the item of user equipment minimising an error between the value of the longitude angle associated with the latitude angle from the first determination and the second value of the latitude angle from the third determination.

Thus, pairs of possible longitude and latitude angle values of the item of user equipment are determined by applying the radiation pattern model of each radiating element of each base station, and the knowledge of the relative position of the two base stations and the trigonometric relationships between the angles are then used to clear up the ambiguity about the longitude angle value of the item of user equipment and the latitude angle $\varphi 1$ of the item of user equipment, within the power measurement inaccuracy.

In this way, the longitude and latitude angles of the item of user equipment can be obtained quite simply from a complex system of equations.

The development also relates to a computer program product comprising program code instructions for implementing a method for geolocating an item of user equipment according to the development, as described previously, when it is executed by a processor.

The development also relates to a computer-readable storage medium on which the computer programs as described above are recorded.

Such a storage medium can be any entity or device able to store the program. For example, the medium can comprise a storage means, such as a ROM, for example a CD-ROM or a microelectronic circuit ROM, or a magnetic recording means, for example a USB flash drive or a hard drive.

On the other hand, such a storage medium can be a transmissible medium such as an electrical or optical signal, that can be carried via an electrical or optical cable, by radio or by other means, so that the computer program contained therein can be executed remotely. The program according to the development can be streamed in particular on a network, for example the Internet network.

Alternatively, the storage medium can be an integrated circuit in which the program is embedded, the circuit being adapted to execute or to be used in the execution of the above-mentioned geolocation method.

The development also relates to a device for geolocating an item of user equipment receiving a plurality of radio frequency beams transmitted respectively by at least one antenna of a first base station configured to transmit according to at least a first and a second propagation direction, and by at least one antenna of a second base station configured to transmit according to at least a third and a fourth propagation direction.

Said device comprises a reprogrammable computing machine or a dedicated computing machine configured to:

obtain a power measured by said item of user equipment for radio frequency beams transmitted by the first base station according to at least the first and the second propagation direction and radio frequency beams transmitted by the second base station according to at least the third and the fourth propagation direction, respectively delivering a first set of measured powers for the first base station and a second set of measured powers for the second base station;

calculate at least one item of information per base station, representative of a ratio or a difference between a first and a second power of each set of measured powers, referred to as first item of relative power information for the first base station and second item of relative power information for the second base station, the first power being associated for the first base station with a radio frequency beam transmitted according to the first propagation direction and the second power being associated with a beam transmitted according to the second propagation direction, the first power being associated for the second base station with a radio frequency beam transmitted according to the third propagation direction and the second power being associated with a beam transmitted according to the fourth propagation direction; and determine a position of said item of user equipment from, on the one hand, said at least one first and second item of relative power information and, on the other hand, for each item of relative power information and for each radio frequency beam associated with said item of relative power information, an antenna radiation pattern model characterising the power of said radio frequency beam associated with said item of relative power information, according to a direction of observation of the item of user equipment by said antenna.

Advantageously, said device is configured to implement the above-mentioned method for geolocating an item of user equipment, according to its different embodiments.

Advantageously, said device can be integrated into an item of equipment of the communication network. It is for example a base station with at least two antennas according to a SISO-type technology transmitting according to distinct propagation directions or an antenna comprising an array of radiating elements according to a MIMO-type technology.

As a variant, the geolocation device according to the development is integrated in an item of user equipment able to connect to said communication network.

Correlatively, the development finally relates to a system for geolocating an item of user equipment receiving a plurality of radio frequency beams transmitted respectively by at least one antenna of a first base station configured to transmit according to at least a first and a second propagation direction, and by at least one antenna of a second base station configured to transmit according to at least a third and a fourth propagation direction.

Such a system comprises at least the first and the second base station and a geolocation device mentioned above.

The above-mentioned corresponding geolocation system, item of user equipment, base station, geolocation device and computer program have at least the same advantages as those provided by the above-mentioned method according to the different embodiments of the present development.

BRIEF DESCRIPTION OF THE DRAWINGS

Other purposes, features and advantages of the development will become more apparent upon reading the following description, hereby given to serve as an illustrative and non-restrictive example, in relation to the figures, among which:

FIG. 1b represents the sectors covered by two sector antennas of the base station of FIG. 1a;

FIG. 1c represents the sectors covered by three sector antennas of the base station of FIG. 1a;

FIG. 2b represents a base station equipped with the array of radiating elements of FIG. 2a;

DETAILED DESCRIPTION OF CERTAIN ILLUSTRATIVE EMBODIMENTS

General Principle of the Development

The general principle of the development is based on obtaining powers measured by an item of user equipment located at a given altitude, for radio frequency beams it receives from a first base station and a second base station, each base station comprising at least one antenna configured to transmit radio frequency beams according to least two propagation directions, on calculating at least one item of relative power information per base station, representative of a ratio or a difference between a first and a second measured power, and on determining a position of said item of user equipment at the given altitude from, on the one hand, said relative power information and, on the other hand, for each item of relative power information and for each radio frequency beam associated with said item of relative power information, an antenna radiation pattern model characterising the power, according to a direction of observation of the item of user equipment by the transmitting antenna, of said radio frequency beam associated with said item of relative power information.

The development is compatible with both SISO and MIMO technologies and has numerous applications, particularly in the geolocation of ships at sea. More generally, it geolocates any item of user equipment within the range of two base stations from radio frequency beams transmitted according to distinct propagation directions by each of these base stations.

In the remainder of the description, an embodiment of the development will be described in detail.

Figure 1A:
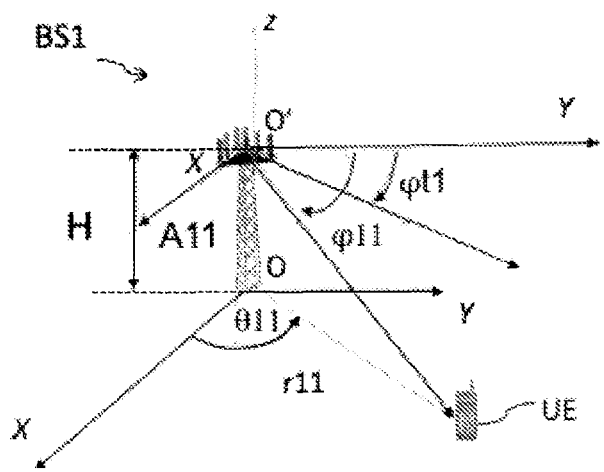
FIG. 1a represents an item of user equipment connected to a base station of a radio communications network.
Figure 1B:
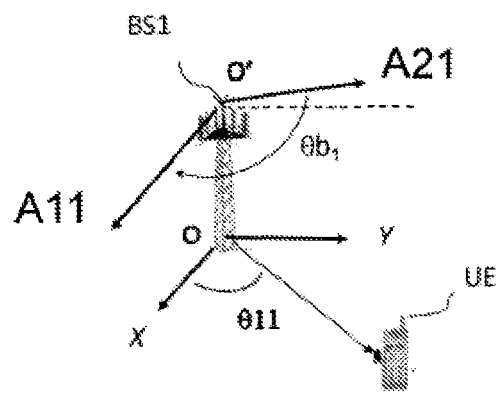
Figure 1C:
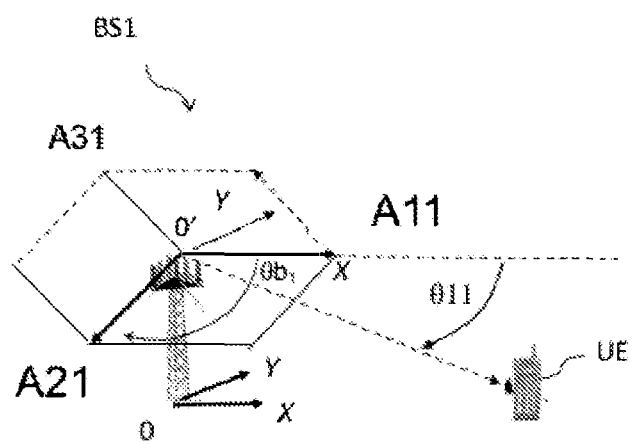

An item of user equipment UE receiving the radio frequency beams transmitted by a first base station BS1 of a radio communications network according to an embodiment of the development based on a SISO-type technology is now presented in relation to FIGS. 1a-1c. In this embodiment, the item of user equipment UE is connected to the base station BS1.

In other embodiments, the item of user equipment UE is not connected to the first base station BS1, for example when it implements itself the geolocation method according to the development. In this case, the item of user equipment UE does not need to report back to the first base station BS1 the power measurements it performs.

Back to FIGS. 1a and 1b, the radio communications network is a cellular network, such as a 2G, 3G, 4G or 5G network defined by the 3GPP standard or another standard.

In the present application, a base station is defined as being dedicated to the management of a given geographical site (for example, a geographical site corresponds to a cell of the network). In the case of FIG. 1a and FIG. 1b, the first base station BS1 manages the corresponding geographical site in a multi-sector manner. More particularly, the first base station BS1 in FIG. 1b covers the site via two distinct sectors, each sector being covered by a corresponding sector antenna A11, A21. In the present application, "sector antenna" refers to an antenna that transmits primarily in a given propagation direction. For example, a cell of the radio communications network comprises two sectors. The 2 sectors are assumed here to be of identical dimensions. For the purposes of simplification, it is assumed that each sector is defined by a deviation angle, $\theta b_1$, in the horizontal plane that is $\theta b_1 = 120°$ in this example. This value of $\theta b_1$ will be used in the embodiment detailed below.

It should be noted that other deviation angle values can be chosen.

Each sector is covered by means of a single antenna A11, A21 able to transmit according to a single beam in a given propagation direction (or at least a single main beam concentrating most of the power radiated by the antenna) over a given band of frequencies. In other words, the propagation (or radiation) directions of the beams transmitted by the antennas A11, A21 covering two adjacent sectors of this site have an angle between them that is equal to $\theta b_1$. Each antenna A11, A21 is characterised, in a manner known per se, by a radiation pattern.

Naturally, as already mentioned, the development also applies in the case where the base station is equipped with three antennas A11, A21, A31, as illustrated in FIG. 1c. In this case, it is sufficient that the item of user equipment UE receives the radio frequency beams transmitted by only two of them for the development to be applicable.

For example, antennas as described in the document Report ITU-R M.2135-1 from the ITU-R, entitled "*Guidelines for evaluation of radio technologies for IMT*

*Advanced*", of December 2009, are considered. The radiation pattern of each antenna A11, A21 has a three-decibel opening angle in the horizontal plane noted $\theta_{3\,dB}$.

The antennas A11 and A21 are co-located at the base station BS1, which is located at a point of the cell covered by the base station BS1. Note that "co-located" means that the antennas A11, A21 are at a same site (i.e. a same base station here). However, they are not necessarily positioned at a same geographical point (corresponding to an ideal distance of zero between the antennas) and may be separated by a few centimetres or a few dozen centimetres, or even a few metres. For example, the antennas may be spaced apart by a distance of less than $\lambda/2$ where $\lambda$ is the wavelength of the signals transmitted by the antennas A11, A21 to communicate over the network. As a variant, they may be spaced apart by a distance greater than $\lambda/2$. Note that in an urban environment, a lower spacing of 3 to 5 metres is preferable; in a rural environment, a greater spacing may be considered, the cells covering larger areas.

In the example considered here, for the purposes of simplification, it is assumed that the antennas A11 and A21 are located at a same point on top of a tower of the base station BS1.

As illustrated in FIG. 1a, the item of user equipment UE identified with respect to the first base station BS1 in an orthonormal frame Oxyz. The origin O of the frame is located at the base of the tower of the base station BS1 supporting the antennas A11, A21, at ground level. The axis Oz is vertical (along the tower here, parallel to it) and the axes Ox and Oy define a horizontal plane parallel to the ground and perpendicular to the tower. In the example considered here, the plane (Oxy) is at ground level and is tangent to the Earth's surface at the point O located at the base of the tower. The axis Ox coincides with the projection of the main propagation direction of the antenna A11 onto this horizontal plane parallel to the ground. The projection of the main propagation direction of the antenna A21 in the plane Oxy is obtained from the deviation angle 8b1, as shown in FIG. 1b.

The direction of observation of the item of user equipment UE by an antenna of the base station is referred to here as its direction seen from this antenna.

The frame O'xyz whose origin O' is located at the top of the tower, and more particularly at the point where the antenna A11 is located (and in the example considered here, the two antennas are assumed to be co-located at a same point for the purposes of simplification, as mentioned above) is also considered.

For example, the item of user equipment UE is identified via angles of a spherical coordinate system ($\theta 11$, $\varphi 11$) in the frame O'xyz in question, and by the distance r11 representing the projection in the horizontal plane Oxy of the distance of the item of user equipment UE with respect to the origin O' of the frame O'xyz. For the purposes of simplification, it is assumed here that the item of user equipment UE is located in the horizontal plane Oxy, at ground level (the height of the user item of equipment UE with respect to the ground is disregarded). In other words, in FIG. 1a, r11 represents the distance of the item of user equipment UE with respect to the base of the tower located at O, supporting the antennas A11, A21, and $\theta 11$ and $\varphi 11$ representing respectively the longitude and the latitude of the item of user equipment UE in the frame O'xyz. The angle $\theta 11$ is thus defined via the projection of the vector joining the origin of the frame O'xyz to the item of user equipment UE in the horizontal plane Oxy, and measured with respect to the projection of the main propagation direction of the antenna A11 in this plane (which coincides with Ox). The coordinates (r11, $\theta 11$, $\varphi 11$) define the relative position of the item of user equipment UE with respect to the first base station BS1, that is, taking the position of the first base station BS1 as a reference. To obtain the absolute position of the item of user equipment UE in another reference frame, for example the terrestrial reference frame, the Greenwich meridian, etc., the position of the first base station BS1 in this reference frame should be taken into account. This position is known to the telecommunications network to which the first base station BS1 belongs.

It is further noted that the item of user equipment UE can be located at an altitude other than that of ground level; for example, the item of user equipment UE can be on a ship at sea and be located at sea level, the sea level and the ground level where the tower of the base station BS1 is located not necessarily being the same. In this case, it is possible to either consider a frame Oxyz located at the altitude of the item of user equipment UE (typically at sea level in the example considered above) with in this frame an altitude z1 of the item of user equipment equal to 0, or keep the same definition for the frame (Oxyz) (i.e. origin O on the ground, at the base of the tower) and consider that the altitude z1 of the item of user equipment in this frame is that of sea level in this frame.

The antennas A11, A21 transmit radio frequency beams according to a tilt angle $\varphi t1$ corresponding to a deviation angle (deviation latitude here) of their radiation pattern with respect to the horizontal plane O'xy (and thus Oxy).

Such sector antennas A11, A21 are for example suitable for a SISO (Single Input Single Output) implementation of the radio communications network considered.

In FIG. 1a, the antennas A11 and A21 are at a height H which corresponds to the distance between the antennas and the ground. In other words, the plane O'xy is at a height H with respect to the plane Oxy.

Figure 2A:
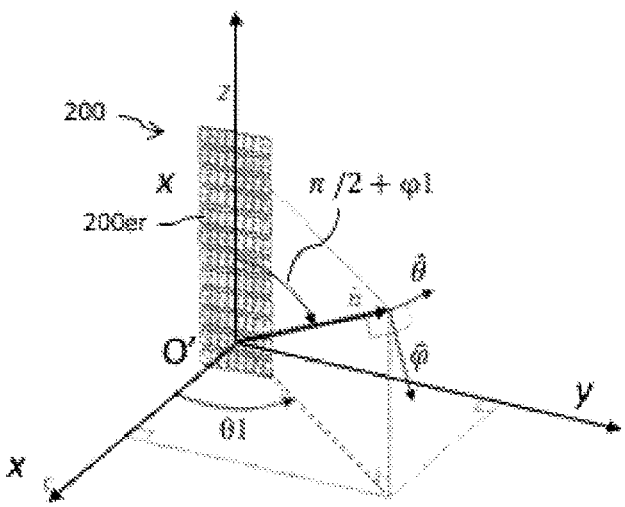
FIG. 2a represents an antenna comprising an array of radiating elements that can equip the base station of FIGS. 1a and 1b according to an embodiment of the development.
Figure 2B:
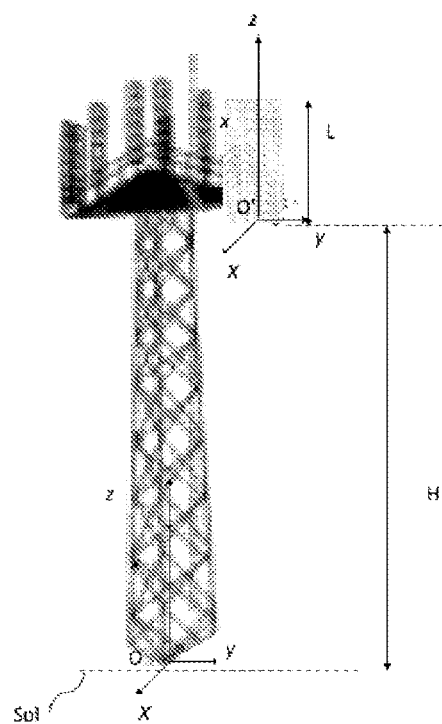

An antenna comprising an array 200 of radiating elements 200er, for example of electronic scanning type, that can be fitted to the base station BS1 of FIG. 2b according to another embodiment of the development, is now presented in relation to FIG. 2a.

More particularly, in this example, the array 200 comprises $N_H=8$ radiating elements 200er in the horizontal direction (i.e. according to the direction O'y of the frame in this case) and $N_V=12$ radiating elements 200er in the vertical direction (i.e. according to the direction Oz of the frame in this case).

Note that in the present embodiment, the origin O' of the frame O'xyz is located at the lower end of the array 200, as illustrated in FIG. 2b. The direction O'x is perpendicular to the plane of the array of radiating elements and coincides with a main propagation direction (or equivalently radiation) of this array 200.

The respective centres of two consecutive radiating elements 200er are spaced apart by a distance $d_V$ in the vertical direction, and by a distance du in the horizontal direction. In other words, the pitch of the array 200 is $d_V$ in the vertical direction and $d_H$ in the horizontal direction. In other embodiments, other numbers $N_H$ and $N_V$ of radiating elements 200er are considered.

In relation to FIGS. 2a and 2b, such an array 200 of radiating elements is capable of transmitting different radio frequency beams each pointing in a desired propagation direction around the main propagation direction of the array 200. More particularly, weighting laws (in amplitude and/or in phase) of each radiating element 200er must be implemented. Examples of such laws are given below in relation to the description of FIG. 4. For example, an array 200 of radiating elements 200er as specified in the document 3GPP TR 37.842 V. 13.2.0 is considered.

Such an array 200 is for example suitable for a MIMO (Multiple-Input-Multiple Output) implementation of the radio communications network considered. In relation to FIG. 2B, the array of radiating elements of FIG. 2a is located at the top of the tower of the base station tower it is fitted to. In the following, the frame of the base station, as in the SISO case, refers to the frame Oxyz located at ground level, at the base of this tower.

Figure 3:
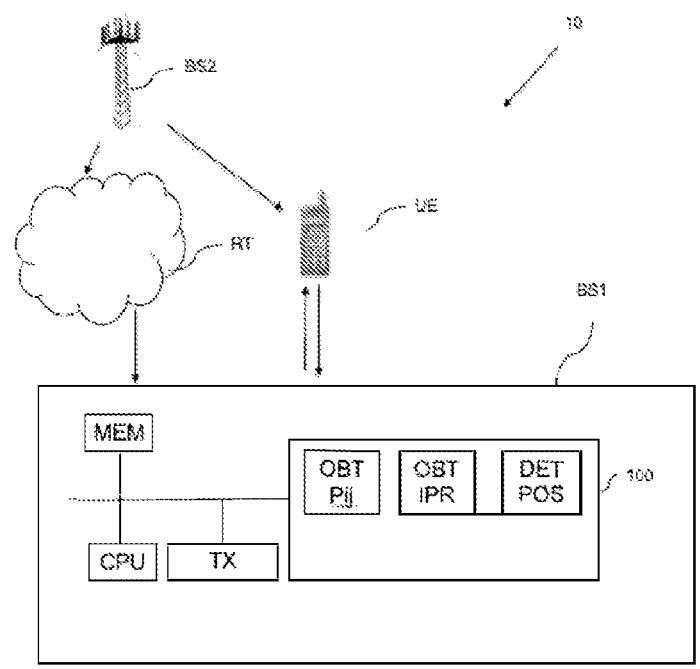
FIG. 3 illustrates an example of the architecture of a system for geolocating an item of user equipment according to an embodiment of the development.

A system 10 for locating a user of an item of terminal equipment UE in a telecommunications network RT according to an embodiment of the development is now described in relation to FIG. 3. Such a network comprises the base station BS1, just described in relation to FIGS. 1a and 1b, and a second base station BS2, having the same or similar characteristics to those described for the first base station BS1.

However, note that the antennas of the second base station BS2 can have heights that are different from those of the antennas of the first base station BS1.

The system 10 further comprises a device 100 configured to geolocate the user of the item of terminal equipment UE in the network RT.

In an embodiment, such a device comprises a module OBT. Pij for obtaining a power measured by said item of user equipment for each of the radio frequency beams transmitted by the first base station according to the first and the second propagation direction and each of the radio frequency beams transmitted by the second base station according to the third and the fourth propagation direction, respectively delivering a first set of measured powers for the first base station and a second set of measured powers for the second base station; a module OBT. IPR for calculating at least one item of information per base station, representative of a ratio or a difference between a first and a second power of each set of measured powers, referred to as first item of relative power information for the first base station and second item of relative power information for the second base station, the first power being associated for the first base station with a radio frequency beam transmitted according to the first propagation direction and the second power being associated with a beam transmitted according to the second propagation direction, the first power being associated for the second base station with a radio frequency beam transmitted according to the third propagation direction and the second power being associated with a beam transmitted according to the fourth propagation direction; and a module DET. POS for determining a position of said item of user equipment from, on the one hand, said at least one first and second item of relative power information and, on the other hand, for each item of relative power information and for each radio frequency beam associated with said item of relative power information, an antenna radiation pattern model characterising the power of said radio frequency beam associated with said item of relative power information, according to a direction of observation of the item of user equipment by said antenna. The device 100 thus implements the geolocation method according to the development that will be described in more detail in relation to FIGS. 4 and 6.

In the example of FIG. 3, the device 100 is housed in the network itself and integrated into the first base station BS1, which typically comprises memories MEM associated with a processor CPU. The memories can be of type ROM (Read Only Memory), RAM (Random Access Memory) or Flash.

The first base station BS1 further comprises a module TX configured to control the transmission/reception of radio frequency beams by its antenna(s) (not shown) depending on the type of technology used. As a variant, the device 100 could be integrated into the second base station BS2 or into an item of node equipment of the network RT. According to another embodiment, it is integrated into the item of terminal equipment UE.

Figure 4:
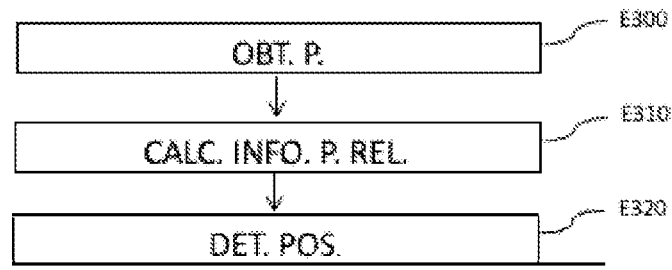
FIG. 4 represents the steps of the geolocation method according to an embodiment of the development.
Figure 5:
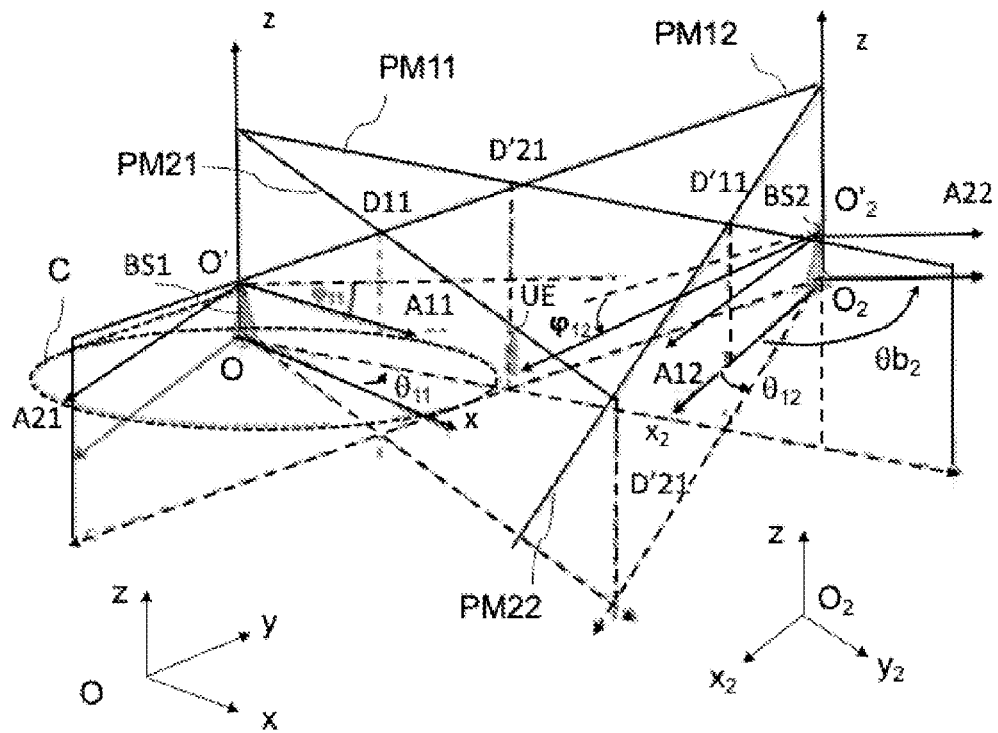
FIG. 5 geometrically illustrates the method for geolocating an item of user equipment according to an embodiment of the development in the system of FIG. 3.

The steps of the geolocation method according to an embodiment of the development in the environment illustrated by FIG. 4 are now presented in relation to FIG. 5.

In a step E300, the power of a plurality of radio frequency beams transmitted by the first base station BS1 according to different propagation directions is obtained. More particularly, such a power is measured by the item of user equipment UE. In this way, a corresponding set of measured powers is obtained. Note that the radio frequency beams whose power is measured by the item of user equipment UE are not necessarily radio frequency beams that have been transmitted by the station base BS1 to the item of user equipment UE.

Indeed, for illustrative purposes, in the SISO configuration shown in FIG. 1a-1c, the item of user equipment UE, because of its position, where applicable, in one of the sectors covered by the base station BS1, receives the radio frequency beams transmitted by the antenna of the base station BS1 covering this sector, for example the first antenna A11 according to a first propagation direction.

However, it is also able to receive radio frequency beams transmitted by another antenna of the base station BS1 covering a sector adjacent to the one in which it is located, for example of the second antenna A21 according to a second propagation direction. Similarly, in a MIMO configuration based, for example, on an antenna comprising an array of radiating elements as shown in FIGS. 2a and 2b, several radio frequency beams can be transmitted simultaneously in several distinct propagation directions, which do not necessarily coincide with the direction of the item of user equipment UE with respect to the antenna in question. However, it may be able to receive these radio frequency beams even if they are not directly intended for it. To implement the development, it is assumed that the radio frequency beams transmitted by the first base station can be measured by the item of user equipment and that it is able to distinguish this power from noise power. For example, the item of user equipment UE identifies which antenna A11, A21 has transmitted the beam for which it is measuring power from information carried by the beam in question in signal channels, known as common channels. Such information corresponds, for example, to pilot symbols, which are known per se. This information is transmitted to it by the base station spontaneously or at its express request.

According to the development, the item of user equipment UE also receives from the second base station BS2 a first radio frequency beam transmitted according to a third propagation direction and a second radio frequency beam transmitted according to a fourth propagation direction. These beams transmitted by the second base station can be received simultaneously or consecutively with those transmitted by the first base station BS1.

Furthermore, as illustrated in FIG. 1a, it is assumed that the first and second antennas of the first base station BS1 are located at a same height H and transmit radio frequency beams according to a same tilt angle, or first tilt $\varphi t1$ (i.e. a same latitude, not shown in FIG. 5) with respect to the horizontal plane O'xy (and thus with respect to the horizontal plane Oxy). Similarly, it is assumed that the first and second antennas of the second base station BS2, A12 and A22, transmit radio frequency beams according to a same tilt angle, or second tilt φt2 (i.e. a same latitude, not shown in FIG. 5) with respect to a horizontal plane $O_{2'x_2y_2}$ defined with respect to the second base station BS2, in the same way as the plane O'xy was previously defined with respect to the first base station BS1. In other words, $O_2'$ is located at the top of the tower of the base station BS2, at the point where the antennas A12 and A22 of the base station BS2 (assumed to be co-located at a same point for the purposes of simplification) are located. The axis $(O_2'x_2)$ coincides with the projection of the main propagation direction of the antenna A12 on a plane that is parallel to the ground, located at ground level. For the purposes of simplification here, it is assumed that the base stations BS1 and BS2 are close enough to each other to disregard the radius of curvature of the Earth between these two base stations so that the planes (O'xy) and $(O_2'x_2y_2)$ are assumed to coincide. The inventor observed that this assumption remains valid even when the base stations considered are several tens of kilometres apart.

φt1 and φt2 can have identical or distinct values. Note that, according to the development, it is not necessary to know the height of the antenna(s) of the second base station BS2. In some embodiments, the powers measured by the item of user equipment UE are fed back by the latter to the radio communications network (e.g. via a transmission to the first base station BS1 or alternatively to the second base station BS2 or to an item of node equipment EN of the network RT). This is the case, for example, when the device 100 implementing the present geolocation method is housed in the network itself (e.g. in a node of the network or in one of the two base stations BS1, BS2). In these embodiments, the first base station BS1 receives from the item of user equipment the power measured by the item of user equipment UE for each radio frequency beam of the plurality of radio frequency beams transmitted by the first base station BS1 according to the first and the second propagation direction (forming a "first set (P11, P21) of measured powers" in the sense of the development for the first base station BS1) and transmits it to the device 100. In parallel, the second base station BS2 receives the power measured by the item of user equipment UE for each radio frequency beam of the plurality of radio frequency beams transmitted by the second base station BS2 according to the third and the fourth propagation direction (forming a "second set (P12, P22) of measured powers" in the sense of the development for the second base station BS2) and transmits it to the device 100. For example, if the device 100 is integrated into the first base station BS1, the measured powers (P12, P22) are transmitted by the second base station BS2 to the first base station BS1 via the network or through the item of user equipment UE. In other embodiments, the present geolocation method is implemented directly in the item of user equipment UE. In the latter case, the device 100 is integrated into the item of user equipment UE and the measured powers are stored locally.

In a step E310, at least one item of relative power information, representative of a ratio (when the powers are expressed in natural units) or a difference (when the powers are expressed in logarithmic units) between two powers ((P11, P21) for the base station BS1 and (P12, P22) for the base station BS2) of the set of measured powers associated with two corresponding radio frequency beams, transmitted by the same base station, is calculated.

Thus, the device 100 obtains a first item of relative power information M11 from the set of powers measured for the first base station BS1 and a second item of relative power information M12 from the set of powers measured for the second base station BS2. In the case of a SISO configuration, when the antennas of a base station are located at a same geographical point, the effects of fast fading are eliminated when the ratio or difference of the powers received by the user is calculated.

Note that in some embodiments, the antennas may not be exactly co-located, in which case the powers measured by the item of user equipment UE can be averaged over a determined period to eliminate the effects of fast fading. For example, they are collected at a determined acquisition frequency (for example, every millisecond) and are averaged by the item of user equipment UE over a determined period. The duration of this period can be determined according to various parameters, such as the possible mobility of the item of user equipment UE and, if applicable, its speed, etc. This averaging can be done using a sliding window of length equal to the determined period considered. For example, the inventor has determined that for a frequency of 1 GHZ, an average calculated over 50 ms of measurements acquired every millisecond is sufficient for many antennas conventionally used to obtain an accurate estimate of the position of the item of user equipment. This average makes it possible to avoid the fast fading phenomena of the propagation channels, which can differ slightly from one antenna to another in particular when they are a few centimetres or a few dozen centimetres apart.

However, the distance between antennas of a base station must be relatively short for this averaging to eliminate the effect of distancing it from the receiver with sufficient accuracy. In this respect, note that the possible mobility of the item of user equipment UE imposes greater constraints on the speed of measurements than in the static case.

In the case of a MIMO configuration, a single measurement of the power can be considered, all radiating elements being used to transmit the plurality of radio frequency beams.

In E320, the position of the item of user equipment UE is determined from, on the one hand, the relative power information and, on the other hand, for each of such items of relative power information and for each radio frequency beam associated with the item of relative power information (i.e. for each of the two radio frequency beams of different propagation directions whose power is the basis of the item of relative power information in question), an antenna radiation pattern model characterising the power, according to a direction of observation of the user, of the radio frequency beam associated with the item of relative power information.

Figure 6:
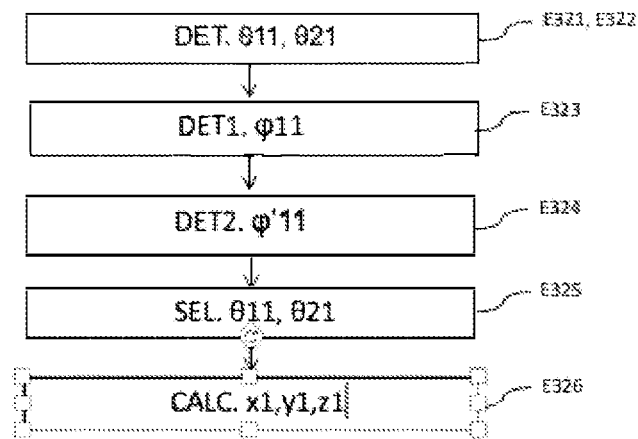
FIG. 6 details the determination of a position of an item of user equipment according to an embodiment of the development implementing a SISO-type technology.

Embodiments of such a geolocation method are now detailed in relation to FIGS. 4 and 6 by reconsidering the configurations of the first and second base stations BS1, BS2 discussed above in relation, on the one hand, to FIGS. 1a and 1b, and, on the other hand, to FIGS. 2a and 2b. In addition, reference is made to the diagrams of FIGS. 5 and 7 which geometrically illustrate the principles of the development.

First, the embodiment of FIG. 6, in which a SISO-type technology is used, is now detailed.

During step E300 already described, the device 100 obtains for example a first P11(UE) and a second P21(UE) measured powers corresponding respectively to a first radio frequency beam transmitted by the first antenna A11 according to a first propagation direction and to a second radio frequency beam transmitted by the second antenna A21 according to a second propagation direction. Indeed, even though the item of user equipment UE is located in a given sector, it receives powers from the different antennas of the base station covering the site. As already mentioned, it is assumed that the first A11 and second A21 antennas transmit radio frequency beams according to different propagation directions but at a same tilt angle or first tilt $\varphi t1$ with respect to the horizontal plane O'xy.

In this way, the first power P11(UE) measured at the item of user equipment UE is expressed generally as:

$$P11(UE) = K.P0.r^{-eta}.G11(\theta 11, \varphi 11).X_{BS}(EU).Y_{BS}(UE) \qquad \text{(Eq. 1)}$$

where K is a constant, r designates the distance between the item of user equipment UE and the antenna A11, eta is a fading factor (also referred to as "path loss" factor) modelling the path loss, P0 is the power transmitted by the antenna A11 on the considered beam, G11($\theta$11, $\varphi$11) is the gain of the antenna A11 radiated on the considered beam in the direction ($\theta$11, $\varphi$11) (which defines the direction of observation of the item of user equipment UE by the antenna A11 in the sense of the development), $X_{BS}(UE)$ is a parameter representing the fast fadings of the propagation channel between the antenna A11 and the item of user equipment UE, and $Y_{BS}(UE)$ is a parameter representing the shadowing effects of the propagation channel between the antenna A11 and the item of user equipment UE. Such modelling is known per se and is not described in more detail here.

Note that the model used in equation (1) linking the power received by the item of user equipment UE to the direction of observation ($\theta$11, $\varphi$11) is obtained by considering that the antenna A11 and the item of user equipment UE are in line-of-sight (LOS): in this configuration, the beam transmitted by the antenna A11 according to the direction ($\theta$11, $\varphi$11) is received according to the same direction by the item of user equipment UE. This line-of-sight configuration is highly probable when the item of user equipment is on a boat at sea or in a rural environment. When the item of user equipment is in an urban environment, it can also be considered, with a non-zero probability, to be in a line-of-sight configuration.

However, this model can still be used when the item of user equipment UE is not considered to be in line-of-sight with the antenna A11 (also known as NLOS (Non Line of Sight) configuration), for example due to the presence of obstacles between the antenna A11 and the item of user equipment UE. In this case, the beam transmitted by the antenna A11 according to the direction ($\theta$11, $\varphi$11) may be received by the item of user equipment UE according to a slightly different direction, for example ($\theta$11+$\delta\theta$11, $\varphi$11+$\delta\varphi$11). The model described above and the resulting location of the item of user equipment UE according to the development may then be less accurate in this configuration.

Alternatively, a more accurate model describing the power received at the user according to the direction of observation of the user by the antenna, estimated for example via numerical simulations or experimentally, can be used in the NLOS configuration. Similarly, the second power P21(UE) measured at the item of user equipment UE is expressed generally as:

$$P21(UE) = K.P0.r^{-eta}.G21(\theta 21, \varphi 21).X_{BS}(EU).Y_{BS}(UE) \qquad \text{(Eq. 2)}$$

where G21($\theta$21, $\varphi$21) is the gain of the antenna A21 radiated on the beam considered in the direction ($\theta$21, $\varphi$21) of the item of user equipment UE (which defines the direction of observation of the item of user equipment UE in line-of-sight by the antenna A21 in the sense of the development).

In practice, assuming that the antennas A11 and A21 have a same radiation pattern and transmit radio frequency beams according to a same tilt angle or tilt $\varphi t1$, thus $\theta 21=\theta b_1-\theta 11$ and $\varphi 21=\varphi 11$ are obtained. The same transmitted power P0 is also assumed for all antennas of the base station BS1. Furthermore, as previously mentioned for the purposes of simplification, it is assumed here that the antennas A11 and A21 are co-located at a same point at the top of the tower of the base station BS1: as a result, the terms representing path loss, fast fading and masking effects are identical in the equations (Eq. 1) and (Eq. 2). The other possible configurations of positioning patterns for the antennas A11 and A21, and their impact on fast fadings and masking effects, have already been mentioned previously.

In this way, when implementing step E310, the first item of relative power information M11 associated with the first and second radio frequency beams is expressed solely according to the gains G11($\theta$11, $\varphi$11) and G21($\theta b_1-\theta$11, $\varphi$11). Indeed, from equations (Eq. 1) and (Eq. 2), the following can be written:

$$M11 = P11(UE)/P21(UE) = G11(\theta 11, \varphi 11)/G21(\theta b_1 - \theta 11, \varphi 11) \qquad \text{(Eq. 3lin)}$$

or, alternatively, in decibels:

$$M11_{dB} = (G11(\theta 11, \varphi 11)_{dB} - G21(\theta b_1 - \theta 11, \varphi 11)_{dB} \qquad \text{(Eq. 3dB)}$$

Note that when the transmission powers of the antennas A11 and A21 are different, the same equations can be obtained to one constant (multiplicative or additive). This constant characterises the ratio (in linear) or the difference (in dB) between the two transmission powers of the antennas considered.

Thus, knowing a model (e.g. analytical or obtained by measurement of the antenna in question) of the antenna radiation pattern characterising the power, according to a direction of observation of the item of user equipment by the antenna considered, of the radio frequency beam considered (here a model for G11($\theta$11, $\varphi$11) and for G21($\theta b_1-\theta$11, $\varphi$11) in line-of-sight), it is possible to trace back all or some of the coordinates characterising the position of the item of user equipment UE by solving the equation (Eq. 3lin) or the equation (Eq. 3 dB) when implementing step E320. In other words, in step E320, determining the position of the item of user equipment UE implements, for at least one given item of relative power information, solving an equation (equation (Eq. 3lin) or equation (Eq. 3 dB)) whose members are a function, on the one hand, of the given item of relative power information, and on the other hand, of an expected value of the given item of relative power information. More particularly, the expected value in question is a function, for each radio frequency beam associated with the given item of relative power information, of the radiation pattern model characterising the power, according to a direction of observation of the item of user equipment by the transmitting antenna, of the radio frequency beam associated with the given item of relative power information.

For example, reconsidering a model of antennas as described in the document ITU-R Report M.2135-1 from the ITU-R, entitled "*Guidelines for evaluation of radio technologies for IMT Advanced*", of December 2009, the following can be written:

$$(G11(\theta 11, \varphi 11))_{dB} = -12(\theta 11/\theta_{3dB})^2 - 12((\theta 11 - \varphi t1)/\varphi_{3dB})^2 \quad \text{(Eq. 4)}$$

where $\theta_{3\ dB}$ represents the three-decibel opening angle of the radiation pattern in the definition plane of the angle $\theta 11$ (i.e. in the horizontal plane Oxy or equivalently O'xy), $\varphi_{3\ dB}$ represents the three-decibel opening angle of the radiation pattern in the definition plane of the angle $\varphi 11$. A vertical plane defined by the vertical axis Oz and by the direction of observation of the item of user equipment UE considered by the antenna A11, that is the direction of the item of user equipment in the equation (Eq. 4) which is given by the angles $\theta 11$ and $\varphi 11$, is considered. This plane is sometimes referred to as meridian plane.

$\varphi t1$ is representative of the tilt angle of the radio frequency beams or first tilt transmitted by the antennas A11 and A21 with respect to the horizontal plane O'xy. Similarly, the following can thus be written:

$$(G21(\theta 21, \varphi 21))_{dB} = -12(\theta 21/\theta_{3dB})^2 - 12((\varphi 21 - \varphi t1)/\varphi_{3dB})^2 \quad \text{(Eq. 5)}$$

Knowing that $\theta 21 = \theta b_1 - \theta 11$ and $\varphi 21 = \varphi 11$ as detailed above, the following is obtained by injecting the equations (Eq. 4) and (Eq. 5) in the equation (Eq. 3 dB):

$$M11_{dB} = 12\theta b_1^2/\theta_{3dB}^2 - 24\theta b_1 \cdot \theta 11/\theta_{3dB}^2 \quad \text{(Eq. 6)}$$

In this way, the angle $\theta 11$ identifying the item of user equipment UE in the frame O'xyz considered centred on the first antenna A11 of the base station BS1 is given by:

$$\theta 11 = -(M11_{dB}/24)\theta_{3dB}^2/\theta b_1 + \theta b_1/2 \quad \text{(Eq. 7)}$$

In other words, as illustrated in FIG. 6, in a first sub-step E321 of step E320, the angle $\theta 11$ is determined from, on the one hand, the first item of relative power information M11 (expressed in logarithmic units in the equation (Eq. 7)) and, on the other hand, the radiation pattern model characterising the power, according to a direction of observation, in this case the direction of the item of user equipment UE with respect to the antennas A11 and A21 respectively, of the first and second radio frequency beams (here G11($\theta 11$, $\varphi 11$) and G21($\theta 21$, $\varphi 21$)).

However, there is uncertainty about the sign of $\theta 11$ according to the value of M11$_{dB}$ (or, alternatively, M11) measured. Two values of $\theta 11$ are indeed possible, the sign of the angle $\theta 11$ in the frame Oxyz depending on the sign of the item of relative power information expressed in decibels M11$_{dB}$.

They therefore define two meridian planes PM11, PM21 in the frame Oxyz of the first base station. The position of the item of user equipment UE is in one of these two planes, either side of the main direction of the first antenna A11 of the first base station BS1. A solution to this indeterminacy will be detailed below.

Advantageously, according to this embodiment of the development, a third power measured for the first base station BS1 in a sub-step E301 of step E300 is obtained in E310. This third power was measured for a radio frequency beam transmitted by the first antenna A11 of the first base station BS1 with a third tilt $\varphi t3$, distinct from the first tilt $\varphi t1$.

Advantageously, this change of tilt and this new transmission of beams are triggered by the first base station BS1. In other words, the first base station BS1 is equipped with antennas which are electronically (for example, remotely) configured to transmit according to two distinct tilt values, for example alternately. In other embodiments, this change of tilt and this additional transmission of beams by the first base station with the third tilt are triggered by the transmission of a request from the item of terminal equipment UE. This is particularly the case when the geolocation device 100 is embedded in the item of terminal equipment UE.

In all cases, the measurements of the powers received according to a first tilt and a third tilt are performed at very close time instants.

According to these embodiments, at least a third item of relative power information M'11, representative of a ratio (when the powers are expressed in natural units) or of a difference (when the powers are expressed in logarithmic units) between the first power P11 of the set of powers measured in E300 and associated with the radio frequency beam transmitted by the first antenna A11 of the first base station BS1 with the first tilt $\varphi t1$ and the power P11' of the set of powers measured and associated with the radio frequency beam transmitted by the first antenna A11 of the first base station BS1 with the third tilt $\varphi t3$, is calculated in E310.

In a second sub-step E322 of step E320, the same procedure as in E321 is followed to obtain, from the relative power information obtained in E310 from the radio frequency beam powers measured for the second base station BS2.

It is first assumed that the first and second antennas of the second base station BS2 transmit with a second tilt $\varphi t2$, equal to the first one $\varphi t1$: $\varphi t2 = \varphi t1$.

The following can therefore be written, in an orthonormal frame $O_2'x_2y_2z_2$ of the first antenna of the second base station (defined in the same way as the frame O'xyz for the first antenna A11 of the first base station BS1, taking, as indicated previously $O_2'$ at the top of the tower of the second base station BS2, where the antennas A12 and A22 of the second base station BS2 are co-located, and defining the axis $O_2'x_2$ with respect to the main propagation direction of the antenna A12):

$$M12 = P12(UE)/P22(UE) = G12(\theta 12, \varphi 12)/G22(\theta b_2, \varphi 12) \quad \text{(Eq. 3lin bis)}$$

or, alternatively, in decibels:

$$M12_{dB} = (G12(\theta 12, \varphi 12) - G22(\theta b_2 - \theta 12, \varphi 12))_{dB} \quad \text{(Eq. 3dB bis)}$$

where G12($\theta 12$, $\varphi 12$) is the gain of the first antenna A12 radiated on the beam considered in the direction ($\theta 12$, $\varphi 12$) of observation of the item of user equipment UE by the antenna A12 and $G22(\theta b2-\theta 12, \varphi 12)$ is the gain of the second antenna A22 radiated on the beam considered in the direction ($\theta 22$, $\varphi 22$) of observation of the item of user equipment UE by the antenna A22. As with M11, gains reflecting line-of-sight of the item of user equipment UE to the antennas A12 and A22 are considered here.

Figure 7:
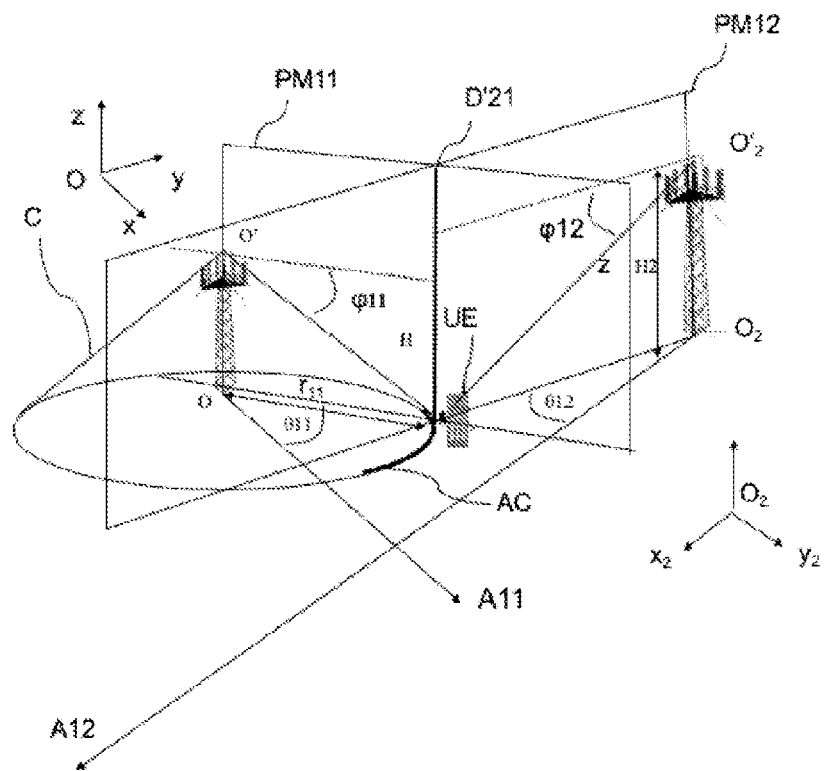
FIG. 7 geometrically illustrates the determination of a position of an item of user equipment according to this embodiment of the development.

In accordance with the equation 4 above, the following is obtained:

$$(G12(\theta 12, \varphi 12))_{dB} = -12(\theta 12/\theta_{3dB})^2 - 12((\varphi 12 - \varphi t1)/\varphi_{3dB})^2 \quad \text{(Eq. 8)}$$

where $\theta_{3\ dB}$ represents the three-decibel opening angle of the radiation pattern in the definition plane of the angle $\theta 12$ (i.e. in the horizontal plane $O_2 x_2 y_2$, which, as mentioned previously, coincides with the plane Oxy, as illustrated in FIGS. 5 and 7), $\varphi_{3\ dB}$ represents the three-decibel opening angle of the radiation pattern in the definition plane of the angle $\varphi 12$. The vertical plane (or meridian plane) defined by the vertical axis $O_2 z$ and by the direction of observation considered, i.e. the direction of the item of user equipment UE in the equation (Eq. 8) is considered.

$\varphi t1$ is representative of the tilt angle of the radio frequency beams or first tilt transmitted by the antennas A12 and A22 with respect to the horizontal plane $O'_2 xy$ and therefore with respect to the horizontal plane $O_2 xy$ (as a reminder, $\varphi t2 = \varphi t1$ in the example considered here).

Similarly, the following can thus be written:

$$(G22(\theta 22, \varphi 22))_{dB} = -12(\theta 22/\theta_{3dB})^2 - 12((\varphi 22 - \varphi t1)/\varphi_{3dB})^2 \quad \text{(Eq. 9)}$$

Knowing that $\theta 22 = \theta b_2 - \theta 21$ and $\varphi 22 = \varphi 12$ as detailed above, the following is obtained by injecting the equations (Eq. 8) and (Eq. 9) in the equation (Eq. 3 dB bis):

$$M12_{dB} = 12\theta b_2^2 / \theta_{3dB}^2 - 24\theta b_2 \cdot \theta 12 / \theta_{3dB}^2 \quad \text{(Eq. 9)}$$

In this way, the angle $\theta 12$ identifying the item of user equipment UE in the frame $O'_2 xyz$ considered centred on the first antenna A12 of the second base station BS2 is given by:

$$\theta 12 = -(M12_{dB}/24)\theta_{3dB}^2 / \theta b_2 + \theta b_2/2 \quad \text{(Eq. 10)}$$

As with the first base station BS1, the longitude $\theta 12$ can take on two distinct values and thus defines two meridian planes PM12, PM22, as illustrated in FIG. 5.

At the end of sub-steps E341 and E342, 4 vertical planes PM11, PM21, PM12, PM22 which intersect in 4 vertical straight lines D11, D21, D'11, D'21 are thus obtained. The position of the item of user equipment UE is at the intersection of one of these straight lines with the horizontal plane corresponding to its altitude, that is in the example considered here of an item of user equipment UE at ground level, with the plane (Oxy).

It should be noted that for the equations (6) and (9) that have just been described to apply, the following conditions must be met in line-of-sight, as specified in the document Report ITU-R M.2135-1 from the ITU-R, entitled "*Guidelines for evaluation of radio technologies for IMTAdvanced*", of December 2009, already mentioned:

$$Gij = -\min(12(\theta ij/\theta_{3dB})^2 + 12((\varphi ij - \varphi t1)/\varphi 3dB)^2, Am) \quad \text{(Eq. 11)}$$

with i the antenna index, an integer equal to 1 or 2, j the base station index, an integer equal to 1 or 2, and Am a constant that characterises the minimum gain value of the antenna.

The longitude and latitude angles must satisfy the following conditions:

$$\theta ij < (Am/12)^{1/2} \theta_{3dB} \quad \text{(Eq. 12)}$$

$$\varphi ij < (Am/12)^{1/2} \varphi_{3dB} + \varphi tk$$

$$12(\theta ij/\theta_{3dB})^2 + 12((\varphi ij - \varphi tk)/\varphi_{3dB})^2 < Am \text{ with } i, j, k = 1, 2, 3$$

If these conditions are not met, the equation (11) for radiation patterns does not apply. A third antenna of the base station, if any, or another base station for which this equation is valid, should then be chosen. This does not raise any difficulty per se for the item of user equipment UE to measure the powers received from another base station, the base stations of a telecommunications network usually being close enough to each other for the item of user equipment UE to receive signals from several base stations.

In the following, it is assumed that, as is generally the case, these conditions are met for the base stations BS1 and BS2 and their respective antennas A11, A21, and A12, A22.

As illustrated in FIG. 7, the first antenna A12 of the second base station BS2 can be located at a height H2 different from the height H of the antennas A11 and A21, and the latitude angle $\varphi 12$ of the item of user equipment UE in the frame of the second base station BS2 is, in the general case, different from the latitude angle $\varphi 11$ in the frame of the first base station BS1. Note, however, that it is not required to know them to implement the development.

A first determination E323 of the latitude angle $\varphi 11$ of the item of user equipment UE in the frame Oxyz of the first base station, according to an embodiment of the development, is now detailed.

To do this, when implementing step E300, the device 100 obtains a third measured power P'11(UE) corresponding to a third radio frequency beam transmitted by the sector antenna A11 according to a second tilt angle or tilt $\varphi t3$, with respect to the horizontal plane O'xy (and therefore with respect to the plane Oxy), different from the first tilt angle or tilt $\varphi t1$.

In this way, when implementing step E310, a third item of relative power information M'11 associated with this third radio frequency beam and the above-mentioned first radio frequency beam is calculated. Thus, in a sub-step E323 of step E320, the angle $\varphi 11$ identifying the item of user equipment UE in the frame O'xyz centred on the antenna A11 of the first base station BS1 is determined from, on the one hand, the second item of relative power information M'11 and, on the other hand, the radiation pattern model characterising the power, according to a direction of observation, of the first and third radio frequency beams.

For example, from the antenna pattern model considered above, the gain $G'11(\theta 11, \varphi 11)$ of the antenna A11 in the direction ($\theta 11$, $\varphi 11$) of the item of user equipment UE when the antenna A11 is transmitting according to a tilt angle equal to φt3 can be written. The following is obtained:

$$(G'11\,(\theta 11, \varphi 11))_{dB} = -12(\theta 11/\theta_{3dB})^2 - 12((\varphi 11 - \varphi t3)/(\varphi_{3dB})^2 \quad \text{(Eq. 13)}$$

According to equation 4, the following is still obtained:

$$(G11\,(\theta 11, \varphi 11))_{dB} = -12(\theta 11/\varphi_{3dB})^2 - 12((\varphi 11 - \varphi t1)/\varphi_{3dB})^2 \quad \text{(Eq. 4)}$$

In this way, from the equations (Eq. 4) and (Eq. 11) it can be written that the second item of relative power information in decibels, $M'11_{dB} = (G11(\theta 1, \varphi 1) - G'11(\theta 1, \varphi 1))_{dB}$, is expressed theoretically as:

$$M'11_{dB} = -12((\varphi 11 - \varphi t1)/\varphi_{3dB})^2 + 12((\varphi 11 - \varphi t3)/\varphi_{3dB})^2 \quad \text{(Eq. 14)}$$

The angle φ11 is thus obtained as being:

$$\varphi 11 = M'11_{dB}/24\phi^{2 3dB}/(\phi t1 - \varphi t3) + (\varphi t1 + \varphi t3)/2 \quad \text{(Eq. 15)}$$

Thus, the longitude angle θ11 and the latitude angle φ11 identifying the user item of equipment UE in the frame Oxyz of the first base station BS1, are determined in a simple and precise manner from the beams transmitted by the antennas A11, A12 of the first base station BS1 according to at least two different tilt angles and from those transmitted by the antennas A12, A22 of the second base station BS2 according to at least one tilt angle which can be equal to one of the two preceding ones.

In E324, a second determination of the latitude angle φ11 in the frame O'xyz of the first base station is performed. As illustrated in FIGS. 5 and 7, this latitude angle φ11 defines a cone C centred on the origin O' of the frame O'xyz.

The position of the item of user equipment UE is at the intersection of this cone C with one of the four straight lines D11, D21, D'11, D'21 and the horizontal plane corresponding to the altitude z1 of the item of user equipment UE in the frame Oxyz (in the example considered here, the item of user equipment UE is assumed to be in the Oxy plane, in other words, z1=0). The coordinates of the item of user equipment UE in the plane Oxyz of the first base station BS1 are noted (x1, y1, z1).

In relation to FIG. 5, the first antenna A11 of the first base station BS1 is located at the origin O' of the frame O'xyz, thus at (0, 0, 0). The first antenna A12 of the second base station BS2 is located at O'$_2$(x0, y0, 0) in the frame O'xyz. Note that in this example it is located at the same height H2=H as the first antenna A11 of the first base station BS1, but that, as previously mentioned, this is not a condition for implementing the development.

For the first base station BS1, the equation of the vertical planes PM11, PM21 passing through the origin O of the frame Oxyz and directed according to the angle θ11 can be written as follows:

$$y = x tg(\theta 11) \quad \text{(Eq. 16)}$$

Similarly, for the second base station BS2, the vertical planes PM12, PM22 are defined in the frame Oxyz by the following equation:

$$y - y0 = (x - x0) tg(\theta 12) \quad \text{(Eq. 17)}$$

As illustrated in FIG. 5, these planes intersect in pairs in a straight line (D11, D21, D'11, D'21) with the following system of equations:

$$y = x tg(\theta 11) \text{ and}$$
$$y - y0 = (x - x0) tg(\theta 12)$$

The third coordinate z is arbitrary.

The item of user equipment UE being at ground level, z1=0 and the line intersects the plane z=0.

The coordinates of the item of user equipment UE in the frame Oxyz are therefore expressed as follows:

$$x1 = (y0 - x0.tg(\theta 12))/(tg(\theta 11) - tg(\theta 12)) \quad \text{(Eq. 18)}$$
$$y1 = x1 tg(\theta 11)$$
$$z1 = 0$$

The two possible values of each longitude angle θ11, θ12, lead to the coordinates of 4 possible points (x1, y1) on the 4 straight lines D11, D21, D11' and D21'.

Yet, the item of user equipment UE is located at a distance r11 from the origin of the frame Oxyz such that r11=H/tg(φ11).

Since the following is obtained: x1=r11·cos(θ11), it can be deduced that: x1=H/tg(φ11)·cos(θ11) and it can be written that:

$$tg(\varphi 11) = H.\cos(\theta 11).[tg(\theta 11) - tg(\theta 12)]/(y0 - x0.tg(\theta 12)) \quad \text{(Eq. 19)}$$

The following is thus obtained:

$$\varphi 11 = \text{Arctan}\big((H/(y0 - x0.tg(\theta 12))).\cos(\theta 11).[tg(\theta 11) - tg(\theta 12)]\big) \quad \text{(Eq. 20)}$$

Thus, there are at this stage two different expressions of φ11 given by the equations 15 and 20 respectively.

In E325, the value of the longitude angles θ11, θ12, which lead to the latitude value φ11 closest to that calculated from the equation (15) can thus be determined.

Note that the difference, if any, between the latitude value obtained from the equation (15) and that from the equation (20) is due to an inaccuracy in the measurement of the powers of the radio frequency beams received by the item of user equipment UE.

Once the uncertainty about the value of the longitude angles θ11, θ12 has been removed, the coordinates x1 and y1 of the item of user equipment UE can be deduced in E326 from the equations (18).

In the example of FIG. 7, the position of the item of user equipment UE geometrically corresponds to the intersection between the cone C and the horizontal plane corresponding to the altitude of the item of user equipment (here the plane z=0 in the frame Oxyz).

The cone C determines an arc of circle AC on the plane Oxy which passes through only one of the 4 vertical straight lines determined previously.

Note that there is a very low probability that this arc of a circle AC passes through more than one of the 4 straight lines. Indeed, a particular positioning pattern of the item of user equipment UE with respect to the base stations BS1 and BS2 would be required, for example the main direction of an antenna of the first base station would have to be aligned with that of an antenna of the second base station considered to determine the position of the item of user equipment UE. In this case, the circle arc could intersect two vertical straight lines.

Note, however, that even in this configuration, the constraints expressed by the equations (12) strongly limit the possibilities of intersection of the arc of circle AC to only one of the four vertical straight lines. If this were not the case, then measurements of the power of radio beams transmitted by a third base station distinct from BS1 and BS2 would have to be taken into account.

In the illustrative example considered above, it was assumed that the item of user equipment UE was at ground level, in other words z1=0. Of course, this assumption is not restrictive per se, and those skilled in the art would be able to adapt the above equations without difficulty to take into account the altitude of the item of user equipment UE.

As an illustration, the case where the item of user equipment UE is on a ship sailing at sea is now considered. It is further assumed that it is at a height h with respect to the sea level, which is at a height $H_M$ with respect to the ground level. In other words, the item of user equipment UE is at a height $h+H_M$ with respect to the ground level.

If the ground level and the sea level $H_M$ coincide, the relative height of the antennas of the base stations BS1 and BS2 in the frame Oxyz with respect to the height of the item of user equipment UE is H–h, where H is the height of the antennas in the frame Oxyz. In this case, the relative height H–h should be considered in the calculation of the tangent of the angle φ11. The following is thus obtained:

$\varphi 11 =$ (Eq. 20)

$\text{Arctan}(((H-h)/(y0 - x0.tg(\theta 12))).\cos(\theta 11).[tg(\theta 11) - tg(\theta 12)])$ Note that if the sea level is below the ground level, then its height $H_M$ is negative in the frame Oxyz. Similarly, the item of user equipment UE can also be at a negative height $h+H_M$ with respect to the ground level.

In all cases, the relative height of the antennas of the base stations BS1 and BS2 with respect to that of the item of user equipment UE should be considered in the equation 20, this one being equal, in the case considered here, to $H-H_M-h$. The value of H is therefore replaced with $H-H_M-h$ in the equation 20.

In the example considered here, a frame Oxyz located at ground level and at the bottom of the tower of the base station has been considered. However, depending on the context in which the development is applied, another reference can be considered for the frame, for example a frame located at sea level.

Alternatively, an embodiment of the development based on two base stations with MIMO-type antenna configuration is now described in relation to FIG. 7. According to this technology, each base station BS1, BS2 is equipped with an antenna comprising an array of radiating elements 200er as illustrated in FIGS. 2a and 2b. This antenna is configured to transmit radio frequency beams according to at least a first propagation direction and a second propagation direction which will be defined below according to angles $\theta_{i,escan}$ and $\varphi_{i,etilt}$.

In this respect, for each antenna (i.e. each array of radiating elements of each base station), the antenna radiation pattern model $A_{A,Beami}(\theta, \varphi)$ characterising the power of an i-th radio frequency beam transmitted according to a direction of observation (θ, φ) for example specified in the document 3GPP TR 37.842 V. 13.2.0 is considered. It is, however, specified here that the notations used, i.e. θ and φ, in the present application for the angles representative of the longitude and the latitude of the item of user equipment UE in the MIMO case are based on a convention that is different from the one used in the document 3GPP TR 37.842 V. 13.2.0: the angle θ in the present application is similar to the angle φ described in the 3GPP document designating longitude, and the angle φ in the present application is similar to the angle $$\left(\theta - \frac{\pi}{2}\right)$$

described in the 3GPP document where θ is the colatitude. It is recalled that the colatitude is equal to the latitude plus π/2.

This radiation pattern model is expressed as follows:

$$A_{A,Beami}(\theta, \varphi) = A_E(\theta, \varphi) + 10\log_{10}\left(\left|\sum_{m=1}^{N_H}\sum_{n=1}^{N_V} w_{i,n,m} \cdot v_{n,m}\right|^2\right) \quad \text{(Eq. 21)}$$

with:

$$v_{n,m} = \exp\left(i2\pi\left((n-1)\frac{d_V}{\lambda}\cos\left(\frac{\pi}{2}+\varphi\right) + (m-1)\frac{d_H}{\lambda}\sin\left(\frac{\pi}{2}+\varphi\right)\sin(\theta)\right)\right)$$

$$w_{i,n,m} = \frac{1}{\sqrt{N_H N_V}}\exp\left(i2\pi\left((n-1)\frac{d_V}{\lambda}\sin\left(\frac{\pi}{2}+\varphi_{i,etilt}\right) + \right.\right.$$
$$\left.\left.(m-1)\frac{d_H}{\lambda}\cos\left(\frac{\pi}{2}+\varphi_{i,etilt}\right)\sin(\theta_{i,escan})\right)\right)$$

where $\theta_{i,escan}$ and $\varphi_{i,etilt}$ represent the longitude and latitude defining the desired propagation direction in the frame O'xyz of the antenna considered (cf. definition given previously with reference to FIG. 2a) for the i-th radio frequency beam respectively in the definition planes of the latitude θ and longitude φ angles of the item of user equipment UE in this frame (which correspond to the θ and φ angles of the SISO case, and define the direction of observation of the user seen by the antenna, noted ($\theta_1$, $\varphi_1$) for the antenna of the first base station BS1, (θ2, φ2) for the antenna of the second base station BS2 and (θ, φ) when the antenna of the first or second base station is designated indifferently), and $A_E(\theta, \varphi)$ represents the radiation pattern, in the frame O'xyz, of each of the radiating elements 200er of the array 200 (assumed to be identical here). In this way, a power P200i (UE) measured by the item of user equipment UE and corresponding to the i-th radio frequency beam transmitted by the array 200 is expressed generally according to the expression:

$$P200i(UE) = K.PO.r^{-eta}.A_{A,Beami}(\theta, \varphi).X_{BS}(UE).Y_{BS}(UE) \quad \text{(Eq. 21bis)}$$

Such an expression has the same structure as the equation (Eq. 1) and the reasoning detailed above applies in the same way. Thus, also in this case, knowing the radiation pattern model of the array 200 of radiating elements 200er, characterising the power, according to a direction of observation (that of the item of user equipment UE by the antenna considered), of the radio frequency beam considered (e.g. the expression of $A_{A,Beami}(\theta, \varphi)$ for an i-th radio frequency beam whose desired propagation direction is $\theta_{i,escan}$ and $\varphi_{i,etilt}$ and a j-th radio frequency beam whose desired propagation direction is $\theta_{j,escan}$ and $\varphi_{j,estilt}$), makes it possible to determine in E320 at least one equation (similar to the equations (Eq. 3lin) and equations (Eq. 3 dB) detailed above in the SISO case) whose members are a function, on the one hand, of the item of relative power information considered calculated by implementing steps E300 and E310 and, on the other hand, of an expected value of the item relative power information that is a function, for each radio frequency beam associated with the item of relative power information considered, of the radiation diagram model characterising the power of this radio frequency beam.

As an example, for each base station BS1 and BS2 an array of radiating elements of dimensions Nh=2; Nv=2 is considered here and radio frequency beams transmitted by its elements according to different propagation directions are considered.

For example, the first base station BS1 transmits, via its array of radiating element, beams f1 and f2 characterised respectively by their propagation direction ($\theta_{1,iescan}$, $\varphi_{1,ietilt}$) and ($\theta_{2,esan}$ and $\varphi_{2,etilt}$).

The following can thus be written:
P200_1(UE)=K·Po·$r^{-eta}$·$A_{A,Beam1}(\theta, \varphi)$·$X_{BS}$(UE)·$Y_{BS}$(UE) for the first beam, and
P200_2(UE)=K·Po·$r^{-eta}$·$A_{A,Beam2}(\theta, \varphi)$·$X_{BS}$(UE)·$Y_{BS}$(UE) for the second beam.

Thus, for the first base station BS1, the following item of relative power information M12 is obtained:

$$M12 = \quad \text{(Eq. 3MIMO)}$$
$$P200\_1(UE)/P200\_2(UE) = A_{A,Beam1}(\theta, \varphi)/A_{A,Beam2}(\theta, \varphi)$$

or, alternatively, in decibels:

$$M12_{dB} = A_{A,Beam1}(\theta, \varphi)_{dB} - A_{A,Beam2}(\theta, \varphi)_{dB};$$

with:

$$A_{A,Beam1}(\theta, \varphi) = A_E(\theta, \varphi) + 10\log_{10}((Module1)^2);$$
$$A_{A,Beam2}(\theta, \varphi) = A_E(\theta, \varphi) + 10\log_{10}((Module2)^2)$$

where (Module1)$^2$ is expressed using the equation 21 as follows.
The following is considered:
dh/λ=a and dv/λ=b where λ is the wavelength $$\frac{1}{\sqrt{N_H N_V}} = 1/2 = c$$

a, b and c being real numbers. Furthermore, the following is set down:

$$a1 = a.\cos(\pi/2 + \varphi_{i,etilt}).\sin(\theta_{i,escan});$$
$$b1 = b.\sin(\pi/2 + \varphi_{i,etilt}).$$

and:

$$v11 = 1$$
$$v12 = e^{2i\pi a.\sin(\pi/2+\varphi)\sin(\theta)}$$
$$v21 = e^{2i\pi b.\cos(\pi/2+\theta)}$$
$$v22 = e^{2i\pi b.\cos(\pi/2+\theta)}.e^{2\pi a.\sin(\pi/2+\varphi).\sin(\theta)}$$
$$w111 = c$$
$$w112 = c.e^{2i\pi a.\cos(\pi/2+\varphi_{1,etilt}).\sin(\theta_{1,escan})} = ce^{2i\pi a1}$$
$$w121 = c.e^{2i\pi b.\sin(\pi/2+\varphi_{1,etilt})} = ce^{2i\pi b1}$$
$$w122 = c.e^{2i\pi a.\cos(\pi/2+\varphi_{1,etilt})\sin(\theta_{1,escan})}.e^{2i\pi b.\sin(\pi/2+\varphi_{1,etilt})}$$

therefore $w122 = c.e^{2i\pi a1}.e^{2i\pi b1}$

This results in the following expression for Module1$^2$:

$$\text{Module1}^2 = |w111.v11 + w112.v12 + w121.v21 + w122.v22|^2$$

$$\text{Module1}^2 = |c + c.e^{2i\pi a1}.e^{2i\pi a.\sin(\pi/2+\varphi)\sin(\theta)} + c.e^{2i\pi b1}.e^{2i\pi b.\cos(\pi/2+\theta)} +$$
$$c.e^{2i\pi a1}.e^{2i\pi b1}.e^{2i\pi b.\cos(\pi/2+\theta)}.e^{2i\pi a.\sin(\pi/2+\varphi)\sin(\theta)}|^2$$
$$= c^2|1 + e^{2i\pi(a1+a.\sin(\pi/2+\varphi)\sin(\theta))} + e^{2i\pi(b1+b.\cos(\pi/2+\theta))} +$$
$$e^{2i\pi(a1+b1+b.\cos(\pi/2+\theta)+a.\sin(\pi/2+\varphi)\sin(\theta))}|^2$$

Module1$^2$=F1($\theta$, $\varphi$, $\theta_{1,escan}$, $\varphi_{1,etilt}$) is set down
therefore the following is obtained: 10 $\log_{10}$(Module1$^2$) =F1($\theta$, $\varphi$, $\theta_{1,escan}$, $\varphi_{1,etilt})_{dB}$ Similarly for the second beam, 10 $\log_{10}$(Module2$^2$)=F2($\theta$, $\varphi$, $\theta_{2,escan}$, $\varphi_{2,etilt})_{dB}$ is obtained In the example considered here, two other beams f3, f4 transmitted by the first base station BS1 according to different propagation directions are further considered. Then, by applying the above to the beams f3 and f4, two expressions analogous to (Eq. 3 dB) of items of relative power information can be obtained:

$$M12_{dB} = F1(\theta, \varphi, \theta_{1,escan}, \varphi_{1,etilt})_{dB} - F2(\theta, \varphi, \theta_{2,escan}, \varphi_{2,etilt})_{dB}$$
$$M34_{dB} = F3(\theta, \varphi, \theta_{3,escan}, \varphi_{3,etilt})_{dB} - F4(\theta, \varphi, \theta_{4,escan}, \varphi_{4,etilt})_{dB}$$

2 equations with 2 unknowns are therefore obtained. Note that the unknowns θ and φ are sine and cosine functions. Therefore there are potentially several solutions. Considering four (or more) beams f1, f2, f3, f4 instead of two as described in the SISO case reduces the number of potential solutions. However, the development also applies when considering only two beams for each base station.

It is clear from this example that due to the complexity of the equation (Eq. 21), an analytical solving is hardly conceivable in the general case to determine the direction (θ, φ) of the item of user equipment UE in the frame Oxyz of the first base station BS1 (noted (θ1, φ1)).

Thus, in some embodiment variants, solving such an equation comprises implementing a numerical solving method.

For example, in E721, I beams are considered, with I an integer greater than or equal to two, transmitted by the first base station BS1, an i-th beam being characterised by a pair $(\theta_{i,etilt}, \varphi_{i,escan})$.

Let us consider for example that the antenna of the first base station BS1 has an array of 4 radiating elements (Nh=4, Nv=4) and the case of I=4 transmitted beams f1, f2, f3, f4. For each beam, the power received by the item of user equipment UE satisfies the equations 21 and 21bis above. The ratio or difference of the powers, received and measured by the item of user equipment UE, corresponding to the beams f1 and f2, makes it possible to calculate an item relative power information value M12, while the ratio or difference of the powers, received by the item of user equipment UE, corresponding to the beams f3 and f4, provides an item of relative power information value such as the ratio M34 These two values each satisfy the equation 21 (in which the factor $Ae(\theta i, \varphi i)$ has been eliminated). Two equations are thus obtained, each a function of $(\theta_{i,escan}, \varphi_{i,etilt})$, whose unknowns are $\theta 1$ and $\varphi 1$, which correspond to the directions of the item of user equipment UE in the frame Oxyz of the first base station BS1.

Solving these two equations provides in this example two possible pairs of values for $(\theta 1, \varphi 1)$.

It is noted however that if the array 200er comprises a larger number of radiating elements, the equations 21 are more complex, so that the number of possible pairs of values for $(\theta 1, \varphi 1)$ is greater than two (compared to the SISO case described above). Note that the determination of a position of the item of user equipment UE according to this embodiment of the development is applicable to a higher number of possible pairs of values, preferably less than 10.

However, to further reduce the number of possible pairs of values for $(\theta 1, \varphi 1)$, other beams transmitted by the array of radiating elements of the first base station, for example, f5, f6, can be used to calculate an additional item of relative power information, such as the ratio M56, in the same way as the relative power information M12 and M34 was calculated. A third equation is thus established as a function of $(\theta_{5,escan}, \varphi_{5,etilt}, \theta_{6,escan}, \varphi_{6,etilt})$, whose unknowns are $\theta$ and $\varphi$, which makes it possible to characterise the pair $(\theta, \varphi)$ more precisely, the set of possible values taken by this pair $(\theta, \varphi)$ in the enlarged system of equations thus obtained being more restricted. If necessary, the operation is repeated with yet other beams until a system of equations whose solving leads to the smallest possible number of possible values of the pair $(\theta 1, \varphi 1)$ is obtained.

According to a variant of step E721, solving such a system of equations comprises exploring the solution space $(\theta 1, \varphi 1)$ in order to determine the direction $(\theta 1, \varphi 1)$ of the item of user equipment UE that is a solution or has values close to the solutions of all equations established with all pairs of beams considered. For example, solving implements, for a given item of relative power information calculated during the implementation of step E310:

obtaining the expected or theoretical value of this item of relative power information given for a set of different directions of observation $(\theta 1, \varphi 1)$, as derived from the radiation model considered above. For example, for each pair of beams transmitted by the array of radiating elements of the first base station, $(\theta 1, \varphi 1)$ is varied degree by degree and each new value of the pair is associated with an expected item of relative power information value, that is as given by the equation 21. A set of expected values, each corresponding to a direction of observation $(\theta 1, \varphi 1)$, is thus obtained; and comparing between, on the one hand, the item of relative power information calculated by step E310, that is originated from the power measurements and, on the other hand, each expected value of the set of expected values associated with the pair of values $(\theta 1, \varphi 1)$. The values of $(\theta 1, \varphi 1)$ whose associated expected item of relative power information value is closest (e.g. in the sense of a given standard of the absolute value type) to the calculated item of relative power information value originating from the power measurements (E300, E310), with an imprecision of the order of the measurement error, are selected.

At the end of this numerical or exploratory solving, a limited number of possible values of $(\theta 1, \varphi 1)$ is obtained, ideally between 2 and 9.

These operations are repeated in E722 for the second base station BS2 and similarly a limited number of possible values are obtained for a pair $(\theta 2, \varphi 2)$ defining the position of the item of user equipment UE in the frame $O_2xyz$ of the second base station BS2. Note that this number may differ from one base station to another.

Note that using two base stations a priori allows the characterisation of the direction of the item of user equipment UE from a smaller number of beams transmitted by each of them. An advantage is that the system of equations established comprises a smaller number of equations, and can be solved with a less complex method.

Thus, in the illustrative example considered above, 4 beams per base station were considered, but only 2 beams per base station could have been used.

From a geometrical point of view, the two possible values of the longitude angle $\theta 1$ in the frame of the first base station BS1 and of the longitude angle $\theta 2$ in the frame of the second base station BS2 define as many vertical planes which intersect in four vertical straight lines, as previously described in the SISO case. Each of these vertical straight lines intersects the horizontal plane corresponding to the given altitude of the item of user equipment UE at a point. At this stage, all of these four points therefore constitute the set of solutions, that is the possible positions of the item of user equipment UE.

In order to determine the position of the item of user equipment UE in the frame Oxyz of the first base station BS1, it is sought in E723 to determine its latitude angle $\varphi 1$. To do this, the equation (20), already described for the SISO case and recalled below, is used:

$$\varphi 1'=\text{Arctan}((H/(y0-x0 \cdot tg(\theta 2))) \cdot \cos(\theta 1) \cdot [tg(\theta 1)-tg(\theta 2)]) \quad (20)$$

where $(x0, y0)$ corresponds to the position of the second base station BS2 in the frame of the first one. H corresponds here to the height of the array of antennas of the first base station BS1 in the frame Oxyz, as illustrated in FIG. 2b, $\theta 1$ is the longitude angle of the item of user equipment UE in the frame Oxyz of the first base station BS1 and $\theta 2$ is the longitude angle of the item of user equipment UE in the frame of the second base station BS2.

More specifically, a value of $\varphi 1'$ which satisfies this equation (20) is calculated for each of the pairs of possible values of latitude angles $(\theta 1, \theta 2)$ obtained during the previous steps E721, E722 and the values of $\varphi 1'$ obtained are compared in E724 with the values of $\varphi 1$ associated with $\theta 1$ in the pairs $(\theta 1, \varphi 1)$ resulting from step E721.

If a single value of $\varphi 1'$ corresponds, within the power measurement inaccuracy, to the value of $\varphi 1$ of only one of the pairs $(\theta 1, \varphi 1)$, it can be deduced that the longitude and latitude angles of the item of user equipment UE are determined by this pair (θ1, φ1).

If more than one value of φ1' matched, then power measurements from additional beams received from the two base stations should be used as discussed above.

Finally, in E725, the coordinates x1, y1 of the item of user equipment UE are deduced from the equation 18 previously described:

$$x1 = (y0 - x0.tg(\theta2))/(tg(\theta1) - tg(\theta2)) \quad \text{(Eq. 18)}$$

$$y1 = x1.tg(\theta1)$$

z1 is zero if the item of user equipment UE is at ground level (where the origin O of the frame of the first base station is located). The different cases considered above in the SISO case, in particular for the case of an item of user equipment UE located on a ship at sea or a change of reference for the frames associated with the base stations, apply in the same way to the MIMO case presented here.

The formulas obtained above are linked to the convention adopted, particularly as regards the definition of the frame Oxyz and the associated angles (i.e. longitude and latitude), but other equivalent formulas can be considered if another convention is adopted.

Figure 9:
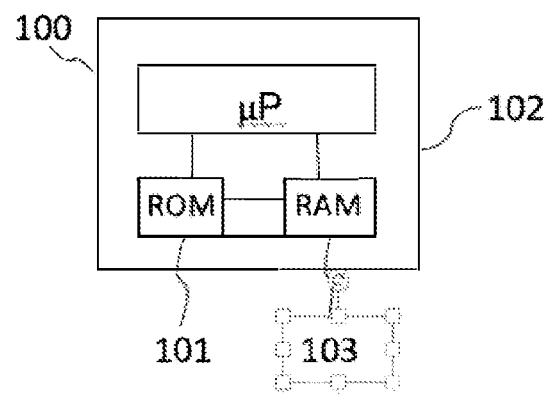
FIG. 9 shows an example of the hardware structure of a device allowing the implementation of the steps of the geolocation method according to an embodiment of the development.

An example of the hardware structure of the device 100 allowing the implementation of the steps of the geolocation method according to the development is now presented in relation to FIG. 9.

The device 100 comprises a random access memory 103 (a RAM memory, for example), a processing unit 102 equipped for example with a processor and controlled by a computer program stored in a read-only memory 101 (a ROM memory or hard disk, for example). At initialisation, the code instructions of the computer program are for example loaded into a random access memory 103 before being executed by the processor of the processing unit 102.

Figure 8:
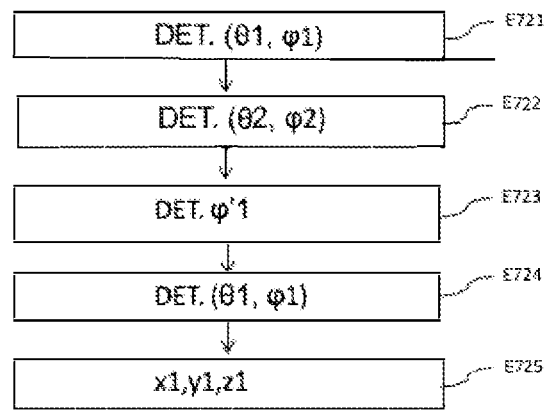
FIG. 8 details the determination of a position of an item of user equipment according to another embodiment of the development implementing a MIMO-type technology.

This FIG. 8 only shows a particular one of several possible manners of realising the device 100 so that it carries out the steps of the geolocation method (according to any one of the embodiments and/or variants described above in relation to FIGS. 4, 6 and 7). Indeed, these steps may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the device 100 is realised with a reprogrammable computing machine, the corresponding program (i.e. the sequence of instructions) can be stored in a removable (such as, for example, a CD-ROM, a DVD-ROM or a USB flash drive) or non-removable storage medium, this storage medium being partially or totally readable by a computer or a processor.

In some embodiments, the device 100 is included in the item of user equipment UE. In some embodiments, the device 100 is included in a device of the radio communications network, e.g. in a node of the communications network or in one of the base stations BS1 or BS2, as illustrated in FIG. 3.

The invention claimed is:

1. A method of geolocating an item of user equipment located at a given altitude, receiving a plurality of radio frequency beams transmitted respectively by at least one antenna of a first base station configured to transmit according to at least a first and a second propagation direction, and by at least one antenna of a second base station configured to transmit according to at least a third and a fourth propagation direction, the method implementing:

obtaining a power measured by the item of terminal equipment for radio frequency beams transmitted by the first base station according to at least the first and the second propagation direction and radio frequency beams transmitted by the second base station according to at least the third and the fourth propagation direction, delivering respectively a first set of measured powers for the first base station and a second set of measured powers for the second base station;

calculating at least one item of information per base station, representative of a ratio or a difference between a first and a second power of each set of measured powers, referred to as first item of relative power information for the first base station and second item of relative power information for the second base station, the first power being associated for the first base station with a radio frequency beam transmitted according to the first propagation direction and the second power being associated with a beam transmitted according to the second propagation direction, the first power being associated for the second base station with a radio frequency beam transmitted according to the third propagation direction and the second power being associated with a beam transmitted according to the fourth propagation direction; and determining a position of the item of user equipment at the given altitude from either 1) the at least one first and second item of relative power information and 2) for each item of relative power information and for each radio frequency beam associated with the item of relative power information, an antenna radiation pattern model characterising the power of the radio frequency beam associated with the item of relative power information, according to the direction of observation of the item of user equipment by the antenna.

2. The method according to claim 1, wherein the determination implements, for at least one given item of relative power information among the (item of) relative power information, solving an equation whose members are a function 1) of the calculated item of relative power information and 2) of an expected value of the given item of relative power information, function, for each radio frequency beam associated with the given item of relative power information, of the radiation pattern model characterising the power of the radio frequency beam associated with the given item of relative power information, according to the direction of observation of the item of user equipment by the antenna.

3. The method according to claim 2, wherein the first base station comprising a first sector antenna configured to transmit radio frequency beams according to the first propagation direction and a second sector antenna configured to transmit radio frequency beams according to the second propagation direction, and the second base station comprising a first sector antenna configured to transmit radio frequency beams according to the third propagation direction and a second sector antenna configured to transmit radio frequency beams according to the fourth propagation direction, the obtaining comprises obtaining a first and a second measured power corresponding respectively to a first radio frequency beam transmitted by the first, respectively the second, sector antenna of the first, respectively second, base station and to a second radio frequency beam transmitted by the first, respectively the second, sector antenna of the first, respectively second, base station,
  wherein the calculation delivers a first, respectively a second, item of relative power information associated with the first and second radio frequency beams for each base station, and
  wherein the determination comprises determining an angle representative of a longitude of the item of user equipment in the frame of the first, respectively the second, base station from 1) the first, respectively the second, item of relative power information (M11, M12) and 2) an antenna radiation pattern model characterising the power, according to the longitude and latitude angles of the item of user equipment, of the first and second radio frequency beams.

4. The method according to claim 3, wherein the solving comprises, for each base station, implementing the equation:

$$\theta 1i = -(M1i_{dB}/24)\theta^2_{3\,dB}/\theta b_i + \theta b_i/2,$$

where:
  i is an integer which is 1 when it refers to the first base station and 2 when it refers to the second base station;
  $\theta 1i$ represents the angle representative of a longitude of the item of user equipment in the frame of the i-th base station,
  $M1i_{dB}$ represents the i-th item of relative power information expressed in decibels,
  $\theta_{3\,dB}$ represents the three-decibel opening angle of the radiation pattern of each of the first and second antennas in a definition plane of the angle $\theta 1i$, and
  $\theta b_i$ represents the deviation angle between the first and second antennas of the i-th base station in the definition plane of the angle $\theta 11$.

5. The method according to claim 3, wherein the first and second radio frequency beams are radiated by the first and second antennas of the first base station according to a first tilt angle,
  the obtaining comprises obtaining a third measured power corresponding to a third radio frequency beam transmitted by the first antenna of the first base station according to a third tilt angle distinct from the first tilt angle,
  the calculation delivers a third item of relative power information, representative of a ratio or a difference between the third measured power and the first power of the first set of measured powers; and
  the determination comprises a first determination of an angle representative of a latitude of the item of user equipment in the frame of the first base station from 1) the third item of relative power information and 2) an antenna radiation pattern model characterising the power, according to the longitude and latitude angles of the item of user equipment, of the first, second and third radio frequency beams of the first base station.

6. The method according to claim 5, wherein the determination comprises, for each base station, implementing the equation:

$$\varphi 11 = M12_{dB}/24\varphi^2_{3\,dB}/(\varphi t1-\varphi t3)+(\varphi t1+\varphi t3)/2,$$

where:
  $\varphi 11$ represents the angle representative of a latitude of the item of user equipment in the frame of the first base station,
  $M12_{dB}$ represents the second item of relative power information expressed in decibels,
  $Q_{3\,dB}$ represents the three-decibel opening angle of the radiation pattern of each of the first and second antennas in a definition plane of the angle $\varphi 11$,
  $\varphi t1$ represents the first tilt angle, and
  $\varphi t3$ represents the third tilt angle.

7. The method according to claim 6, wherein the determination of a position comprises a second determination of a value of the latitude angle of the item of user equipment in the frame of the first base station, according to a height of the first antenna of the first base station and of the longitude angles of the item of user equipment in the respective frames of the first and the second base station and a selection of the value of the longitude angles of the item of user equipment minimising an error between the first and the second determination of the latitude angle.

8. The method according to claim 6, wherein the determination comprises calculating the coordinates of the item of user equipment in the frame of the first base station from the determined longitude angles.

9. The method according to claim 1, wherein the first base station comprising an antenna comprising an array of radiating elements, configured to transmit radio frequency beams according to at least the first propagation direction and the second propagation direction and the second base station comprising an antenna comprising an array of radiating elements configured to transmit radio frequency beams according to at least the third propagation direction and the fourth propagation direction, each radio frequency beam of the plurality of radio frequency beams is radiated by the array of radiating elements of the first, respectively second, base station.

10. The method according to claim 9, wherein the determination implements, for at least one given item of relative power information among the (item of) relative power information, solving an equation whose members are a function 1) of the calculated item of relative power information and 2) of an expected value of the given item of relative power information, function, for each radio frequency beam associated with the given item of relative power information, of the radiation pattern model characterising the power of the radio frequency beam associated with the given item of relative power information, according to the direction of observation of the item of user equipment by the antenna, wherein the equation solving comprises implementing a method for numerically solving the at least one equation.

11. The method according to claim 9, wherein the determination implements, for at least one given item of relative power information among the (item of) relative power information, solving an equation whose members are a function 1) of the calculated item of relative power information and 2) of an expected value of the given item of relative power information, function, for each radio frequency beam associated with the given item of relative power information, of the radiation pattern model characterising the power of the radio frequency beam associated with the given item of relative power information, according to the direction of observation of the item of user equipment by the antenna, wherein the resolution implements for the at least one given item of relative power information:
  obtaining the expected value of the given item of relative power information for a set of directions of observation of the item of user equipment delivering a set of expected values each corresponding to one direction of observation of the item of user equipment among a plurality of directions of observation;

comparing between 1) the calculated item of relative power information and 2) each expected value of the set of expected values delivering a direction of observation for which the expected value of the given relative power is closest to the calculated item of relative power information; and the position of the item of user equipment being a function of the direction of observation delivered.

12. The method according to claim 9, wherein for the first, respectively the second, base station, the antenna radiation pattern model characterising the power of an i-th radio frequency beam according to a direction of observation of the item of user equipment (θ, φ) is expressed according to:

$$A_{A,Beami}(\theta, \varphi) = A_E(\theta, \varphi) + 10\log_{10}\left(\left|\sum_{m=1}^{N_H}\sum_{n=1}^{N_V} w_{i,n,m} \cdot v_{n,m}\right|^2\right)$$

with:

$$v_{n,m} = \exp\left(i2\pi\left((n-1)\frac{d_V}{\lambda}\cos\left(\frac{\pi}{2}+\varphi\right) + (m-1)\frac{d_H}{\lambda}\sin\left(\frac{\pi}{2}+\varphi\right)\sin(\theta)\right)\right)$$

$$w_{i,n,m} = \frac{1}{\sqrt{N_H N_V}}$$

$$\exp\left(i2\pi\left((n-1)\frac{d_V}{\lambda}\sin\left(\frac{\pi}{2}+\varphi_{i,etilt}\right) + (m-1)\frac{d_H}{\lambda}\cos\left(\frac{\pi}{2}+\varphi_{i,etilt}\right)\sin(\theta_{i,escan})\right)\right)$$

where
- θ is an angle representative of a longitude of the item of user equipment in a frame of the first, respectively second, base station,
- φ represents an angle representative of a latitude of the item of user equipment in the frame of the first, respectively second, base station,
- ($\theta_{i,escan}$, $\varphi_{i,etilt}$) represents a pair of angles characteristic of the desired main propagation direction for the i-th radio frequency beam in a reference frame of the antenna,
- $N_H$ represents the number of radiating elements of the matrix of radiating elements in a horizontal direction,
- $N_V$ represents the number of radiating elements of the array of radiating elements in a vertical direction,
- $d_V$ represents the vertical spacing between two radiating elements,
- $d_H$ represents the horizontal spacing between two radiating elements,
- λ represents the wavelength of the radio frequency beam, and
- $A_E(\theta, \varphi)$ represents the radiation pattern of each radiating element of the array of radiating elements;

in that the determination comprises a first determination of at least two pairs of values of the longitude angle and the latitude angle of the item of user equipment in the frame of the first base station from the radiation pattern, a second determination of at least two pairs of values of the longitude angle and the latitude angle of the item of user equipment in the frame of the second base station from the radiation pattern, a third determination of a second value of the latitude angle of the item of user equipment in the frame of the first base station, according to a height of the first base station and the longitude angles of the item of user equipment in the respective frames of the first and the second base station, and a selection of the values of the longitude angles of the item of user equipment minimising an error between the value of the latitude angle associated with the latitude angle from the first determination and the second value of the latitude angle from the third determination.

13. A processing circuit comprising a processor and a memory, the memory storing program code instructions of a computer program for implementing the method according claim 1, when the computer program is executed by the processor.

14. A device for geolocating an item of user equipment receiving a plurality of radio frequency beams transmitted respectively by at least one antenna of a first base station configured to transmit according to at least a first and a second propagation direction, and by at least one antenna of a second base station configured to transmit according to at least a third and a fourth propagation direction, wherein the device comprises a reprogrammable computing machine or a dedicated computing machine configured to:

obtain a power measured by the item of user equipment for radio frequency beams transmitted by the first base station according to at least the first and the second propagation direction and radio frequency beams transmitted by the second base station according to at least the third and the fourth propagation direction, delivering respectively a first set of measured powers for the first base station and a second set of measured powers for the second base station;

calculate at least one item of information per base station, representative of a ratio or a difference between a first and a second power of each set of measured powers, referred to as first item of relative power information for the first base station and second item of relative power information for the second base station, the first power being associated for the first base station with a radio frequency beam transmitted according to the first propagation direction and the second power being associated with a beam transmitted according to the second propagation direction, the first power being associated for the second base station with a radio frequency beam transmitted according to the third propagation direction and the second power being associated with a beam transmitted according to the fourth propagation direction; and determine a position of the item of user equipment from 1) the at least one first and second item of relative power information and 2) for each item of relative power information and for each radio frequency beam associated with the item of relative power information, an antenna radiation pattern model characterising the power of the radio frequency beam associated with the item of relative power information, according to a direction of observation of the item of user equipment by the antenna.

15. An item of user equipment comprising a geolocation device according to claim 14.

16. A base station comprising a geolocation device according to claim 14.

17. A system for geolocating an item of user equipment receiving a plurality of radio frequency beams transmitted respectively by at least one antenna of a first base station configured to transmit according to at least a first and a second propagation direction, and by at least one antenna of a second base station configured to transmit according to at least a third and a fourth propagation direction, wherein the system comprises at least the first and the second base station and a geolocation device according to claim 14.

\* \* \* \* \*